US012669945B2

(12) United States Patent
Ware et al.

(10) Patent No.: US 12,669,945 B2
(45) Date of Patent: Jun. 30, 2026

(54) MAINTENANCE OPERATIONS IN A DRAM

(71) Applicant: Rambus Inc., San Jose, CA (US)

(72) Inventors: Frederick A. Ware, Los Altos Hills, CA (US); Robert E. Palmer, Chapel Hill, NC (US); John W. Poulton, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 19/026,093

(22) Filed: Jan. 16, 2025

(65) Prior Publication Data

US 2025/0224885 A1     Jul. 10, 2025

Related U.S. Application Data

(63) Continuation of application No. 18/610,888, filed on Mar. 20, 2024, now Pat. No. 12,236,111, which is a
(Continued)

(51) Int. Cl.
*G06F 3/06*          (2006.01)
*G06F 13/16*        (2006.01)
(Continued)

(52) U.S. Cl.
CPC .......... *G06F 3/0619* (2013.01); *G06F 3/0629* (2013.01); *G06F 3/0659* (2013.01);
(Continued)

(58) Field of Classification Search
CPC .... G06F 3/0619; G06F 3/0629; G06F 3/0659; G06F 3/0673; G06F 13/1636;
(Continued)

(56) References Cited

U.S. PATENT DOCUMENTS

| | | | |
|---|---|---|---|
| 5,935,257 A | 8/1999 | Nishimura | |
| 6,073,203 A | 6/2000 | Kufer et al. | |

(Continued)

FOREIGN PATENT DOCUMENTS

| | | |
|---|---|---|
| WO | WO-99-46775 | 9/1999 |
| WO | WO-2008-127698 | 10/2008 |
| WO | WO-2008-130878 | 10/2008 |

OTHER PUBLICATIONS

International Search Report and Written Opinion with mail date of Jul. 8, 2010 for International Application No. PCT/US2010/020934. 20 pages.
(Continued)

*Primary Examiner* — Sean D Rossiter
(74) *Attorney, Agent, or Firm* — Morgan, Lewis & Bockius LLP

(57)          ABSTRACT

A system includes a memory controller and a memory device having a command interface, refresh circuitry, control logic, and a plurality of memory banks, each with a plurality of rows of memory cells. The command interface is operable to receive a refresh command from a memory controller and the refresh circuitry is configured to perform one or more refresh operations to refresh data stored in at least one bank of the plurality of memory banks during a refresh time interval in response to the refresh command from the memory controller. The control logic is to configure the command interface to enter a calibration mode during the refresh time interval, and the command interface is configured to perform a calibration operation in the calibration mode during the refresh time interval.

20 Claims, 21 Drawing Sheets

Related U.S. Application Data continuation of application No. 17/829,207, filed on May 31, 2022, now Pat. No. 11,941,256, which is a continuation of application No. 16/875,881, filed on May 15, 2020, now Pat. No. 11,507,280, which is a continuation of application No. 16/372,336, filed on Apr. 1, 2019, now Pat. No. 10,656,851, which is a continuation of application No. 16/145,931, filed on Sep. 28, 2018, now Pat. No. 10,248,342, which is a continuation of application No. 15/942,260, filed on Mar. 30, 2018, now Pat. No. 10,168,933, which is a continuation of application No. 15/253,736, filed on Aug. 31, 2016, now Pat. No. 9,933,960, which is a continuation of application No. 15/132,017, filed on Apr. 18, 2016, now Pat. No. 9,437,276, which is a continuation of application No. 14/937,788, filed on Nov. 10, 2015, now Pat. No. 9,318,183, which is a continuation of application No. 14/613,282, filed on Feb. 3, 2015, now Pat. No. 9,196,348, which is a continuation of application No. 13/145,542, filed as application No. PCT/US2010/020934 on Jan. 13, 2010, now Pat. No. 8,949,520.

(60) Provisional application No. 61/146,612, filed on Jan. 22, 2009.

(51) Int. Cl.

| | |
|---|---|
| *G06Q 10/00* | (2026.01) |
| *G06Q 20/00* | (2012.01) |
| *G11C 7/02* | (2006.01) |
| *G11C 11/406* | (2006.01) |

(52) U.S. Cl.
CPC ........ *G06F 3/0673* (2013.01); *G06F 13/1636* (2013.01); *G06F 13/1689* (2013.01); *G06Q 10/00* (2013.01); *G06Q 20/00* (2013.01); *G11C 7/02* (2013.01); *G11C 11/406* (2013.01); *G11C 11/40611* (2013.01); *G11C 11/40615* (2013.01); *G11C 11/40618* (2013.01); *G11C 2211/4061* (2013.01)

(58) Field of Classification Search
CPC .... G06F 13/1689; G06Q 10/00; G06Q 20/00; G11C 7/02; G11C 11/406; G11C 11/40611; G11C 11/40615; G11C 11/40618; G11C 2211/4061; G11C 29/028; G11C 29/025
See application file for complete search history.

(56) References Cited

U.S. PATENT DOCUMENTS

| | | | |
|---|---|---|---|
| 6,310,814 B1 | 10/2001 | Hampel et al. | |
| 6,711,082 B1 * | 3/2004 | Loffler | G11C 11/40615 |
| | | | 365/225.7 |
| 7,061,821 B2 | 6/2006 | Coteus et al. | |
| 7,362,643 B2 | 4/2008 | Okada | |
| 7,366,862 B2 | 4/2008 | Nystuen et al. | |
| 7,412,616 B2 | 8/2008 | Matsui et al. | |
| 7,839,159 B2 | 11/2010 | Nakamura et al. | |
| 2003/0204669 A1 | 10/2003 | Ranganathan et al. | |
| 2005/0024969 A1 | 2/2005 | Kim | |
| 2006/0104137 A1 | 5/2006 | Bellows et al. | |
| 2006/0106975 A1 | 5/2006 | Bellows et al. | |
| 2006/0117155 A1 | 6/2006 | Ware et al. | |
| 2006/0143372 A1 | 6/2006 | Walker et al. | |
| 2007/0007992 A1 * | 1/2007 | Bains | G11C 29/028 |
| | | | 326/30 |
| 2007/0214335 A1 | 9/2007 | Bellows et al. | |
| 2007/0226529 A1 | 9/2007 | Huang | |
| 2008/0040534 A1 | 2/2008 | Bellows et al. | |
| 2008/0115006 A1 | 5/2008 | Smith et al. | |
| 2008/0168298 A1 | 7/2008 | Bellows et al. | |
| 2009/0116326 A1 | 5/2009 | Lee | |
| 2010/0005212 A1 * | 1/2010 | Gower | G06F 13/4234 |
| | | | 710/308 |
| 2010/0156455 A1 * | 6/2010 | Yang | G11C 7/04 |
| | | | 326/30 |
| 2010/0157709 A1 | 6/2010 | Kim et al. | |
| 2011/0035560 A1 | 2/2011 | Bodrozic et al. | |
| 2011/0126081 A1 | 5/2011 | Kasamsetty et al. | |
| 2011/0185218 A1 * | 7/2011 | Nygren | G11C 7/222 |
| | | | 713/503 |
| 2011/0283060 A1 | 11/2011 | Ware et al. | |
| 2012/0221769 A1 | 8/2012 | Ware et al. | |
| 2013/0064025 A1 | 3/2013 | Chen et al. | |
| 2013/0305074 A1 | 11/2013 | Ellis et al. | |
| 2014/0122922 A1 * | 5/2014 | Hunt | G06F 11/073 |
| | | | 714/E11.023 |
| 2015/0046641 A1 | 2/2015 | Yoshihara | |
| 2016/0239442 A1 | 8/2016 | Chun et al. | |
| 2019/0377831 A1 | 12/2019 | Zhang | |
| 2020/0020384 A1 | 1/2020 | Zhao et al. | |
| 2023/0205434 A1 | 6/2023 | Murphy et al. | |
| 2023/0205435 A1 * | 6/2023 | Murphy | G06F 3/0604 |
| | | | 711/154 |
| 2023/0236653 A1 * | 7/2023 | Kang | G11C 11/4074 |
| | | | 713/320 |
| 2023/0342047 A1 * | 10/2023 | Hadrick | G11C 11/40615 |
| 2023/0342048 A1 * | 10/2023 | Hadrick | G11C 11/40615 |
| 2024/0354014 A1 * | 10/2024 | Vogelsang | G06F 3/0634 |

OTHER PUBLICATIONS

Notification of Transmittal of International Preliminary Report on Patentability (Chapter II) dated Jan. 30, 2012, re Int'l Application No. PCT/US10/20934. 13 pages.

* cited by examiner

1600

| BO0 | BO1 | BO2 | BO3 | BO4 | BO5 | BO6 | BO7 | rsv 08 | rsv 09 | rsv 10 | rsv 11 | rsv 12 | rsv 13 | rsv 14 | rsv 15 |
|---|---|---|---|---|---|---|---|---|---|---|---|---|---|---|---|
| CKE= 1 | RAS= 1 | CAS= 1 | WE= 0 | rsv 20 | rsv 21 | rsv 22 | rsv 23 | CKE= 1 | RAS= 0 | CAS= 0 | WE= 0 | rsv 28 | rsv 29 | rsv 30 | rsv 31 |

Figure 16

MAINTENANCE OPERATIONS IN A DRAM

RELATED APPLICATIONS

This application is a continuation of U.S. patent Ser. No. 18/610,888, filed Mar. 20, 2024, which is a continuation of U.S. patent application Ser. No. 17/829,207, filed May 31, 2022, now U.S. Pat. No. 11,941,256, which is a continuation of U.S. patent application Ser. No. 16/875,881, filed May 15, 2020, now U.S. Pat. No. 11,507,280, which is a continuation of U.S. patent application Ser. No. 16/372,336, filed Apr. 1, 2019, now U.S. Pat. No. 10,656,851, which is a continuation of U.S. patent application Ser. No. 16/145,931, filed Sep. 28, 2018, now U.S. Pat. No. 10,248,342, which is a continuation of U.S. patent application Ser. No. 15/942,260, filed Mar. 30, 2018, now U.S. Pat. No. 10,168,933, which is a continuation of U.S. patent application Ser. No. 15/253,736, filed Aug. 31, 2016, now U.S. Pat. No. 9,933,960, which is a continuation of U.S. patent application Ser. No. 15/132,017, filed Apr. 18, 2016, now U.S. Pat. No. 9,437,276, which is a continuation of U.S. patent application Ser. No. 14/937,788, filed Nov. 10, 2015, now U.S. Pat. No. 9,318,183, which is a continuation of U.S. patent application Ser. No. 14/613, 282, filed Feb. 3, 2015, now U.S. Pat. No. 9,196,348, which is a continuation of U.S. patent application Ser. No. 13/145, 542, filed Jul. 20, 2011, now U.S. Pat. No. 8,949,520, which was a US National Stage Application filed under 35 U.S.C. § 371 of PCT Patent Application Serial No. PCT/US2010/ 020934, filed on Jan. 13, 2010, which claims the benefit of and priority to U.S. Provisional Patent Application Ser. No. 61/146,612 filed on Jan. 22, 2009, all of which are hereby incorporated by reference in their entireties.

TECHNICAL FIELD

The disclosed embodiments generally relate to the field of semiconductor memory, and more particularly to managing maintenance operations in a memory subsystem.

BACKGROUND

The main operating memory of virtually all modern desktop and laptop computers is implemented using dynamic random access memory (DRAM) components. DRAM is relatively inexpensive and provides excellent storage density relative to other types of semiconductor memory.

A defining characteristic of DRAM is that the individual storage cells in a DRAM component usually cannot hold their charge for more than a certain period of time, usually about 70 milliseconds. Consequently, to prevent loss of data, each cell in the DRAM component must be periodically sensed (read) and rewritten in a refresh operation. A refresh operation is thus a type of maintenance operation. Other types of maintenance operations, including calibration of the command interface of the memory device, also need to be performed from time to time. For instance, maintenance operations are needed for signaling optimization in both read and write directions.

BRIEF DESCRIPTION OF THE DRAWINGS

FIG. 16 illustrates an auto-refresh command with bank order information.

DESCRIPTION OF EMBODIMENTS

In a system that includes a memory controller and a memory device having a command interface and a plurality of memory cells, the memory controller transmits an auto-refresh command to the memory device. The command interface of the memory device includes both command/ address (CA) links and data links (DQ), and possibly other lines.

According to one embodiment, responsive to the auto-refresh command, simultaneous core maintenance operations and interface maintenance operations are performed in a memory device. Responsive to the auto-refresh command, a burst refresh is performed in the memory core, while freeing the command interface to carry out periodic maintenance operations, which may be needed for signaling optimization in both read and write directions. Responsive to the auto-refresh command, the memory device performs refresh operations to refresh the memory cells, and the memory controller performs a calibration of the command interface of the memory device. Performing refresh and calibration concurrently in response to the same auto-refresh command can reduce command overhead, and also improve performance in a memory component in which short intervals between periodic calibration intervals are needed to adjust an external clock feedback loop. This may be the case in a memory component with a bit-rate clock and no clock recovery circuitry (such as, no internal clock feedback loop). In some embodiments, a loopback mode of the memory device's command interface is used for maintenance operations, such as for performing periodic transmit phase calibration and periodic receive phase calibration.

According to one embodiment, a memory controller and memory components include logic to utilize a bank order field in the auto-refresh command specifying an order in which memory banks of the memory device are to be refreshed. This may allow the controller to optimize the transaction order both before and after the burst refresh operation, for instance to avoid interference with adjacent read/write transactions which lead to performance loss. Responsive to the auto-refresh command, the memory device sequentially refreshes a respective row in a plurality of memory banks, in the specified bank order. A memory bank order may be specified due to lack of availability of certain memory banks, and/or to avoid or minimize the need for any delay before refreshing the first specified bank of the memory device, and to avoid or minimize the need for any delay after refreshing the last specified bank of the memory device and before a next memory operation can be performed.

Overall System

Figure 1:
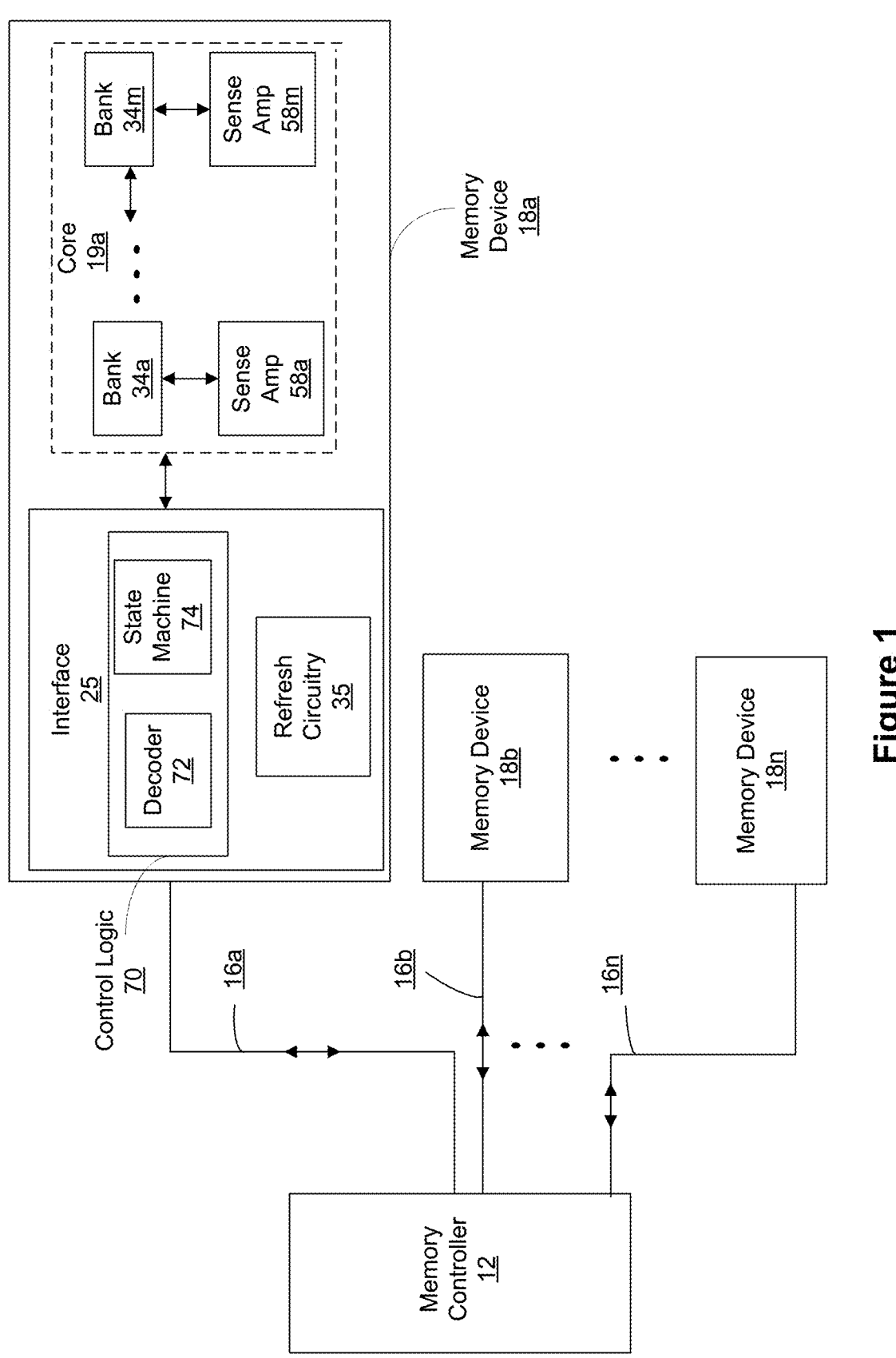
FIG. 1 is a block diagram of memory subsystem in which embodiments of the present invention may be used.

FIG. 1 depicts a memory subsystem 10 in which embodiments of the present invention may be practiced. The memory subsystem 10 includes three primary components: a memory controller 12, signal links 16 and one or more memory devices 18 (e.g., DRAM chips or devices). A plurality "n" of memory devices 18 is shown in FIG. 1. The memory subsystem 10 is intended to be a general purpose high performance memory and may be used in a broad range of applications. For example, the memory subsystem 10 may be used as a main memory or graphics memory in a computer system. The memory subsystem 10 may also be used as a memory in consumer electronics devices such as personal digital assistants or digital cameras, or in any other application where high performance data storage is required.

The controller 12 and the DRAM devices 18 are connected by signal lines 16 that together constitute a communications channel or link. While FIG. 1 illustrates "n" signal lines 16, other embodiments may have fewer or more signal lines 16. The signal lines 16 may correspond to an interconnect, an interface, a bus, and/or a back plane. The signal lines 16 may be used for inter-chip communication, such as between one or more semiconductor chips (also called integrated circuits) or dies, or for communication within a semiconductor chip, also known as intra-chip communication, such as between modules in an integrated circuit.

In the embodiment shown in FIG. 1, signal lines 16 are bidirectional and may be used for bidirectional communications between the controller 12 and one or more of the memory devices 18. Optionally, the bidirectional communications on a signal line may be simultaneous. However, in the embodiments described here, communications on each individual signal line 16 are unidirectional at any one point in time, but different signal lines 16 can have signals flowing in opposite directions at the same point in time. In some embodiments, one or more of the signal lines 16 and the corresponding transmitters and receivers in the controller 12 and/or the memory devices 18 may be dynamically configured for bidirectional communications.

The memory controller 12 manages the operation of the DRAM devices 18 by transmitting various packetized commands on a command portion of the signal lines 16. These packetized commands can include read and write commands that require data to be transported to and from the DRAM devices 18 via a data portion of the signal lines 16. The packetized commands also include commands for performing overhead operations such as refresh operations and DRAM calibration operations.

A DRAM device (also herein called "a DRAM") 18 includes a command interface 25 that includes cell refresh circuitry 35 and control logic 70, and a memory core 19 that includes a plurality (a plurality "m" is shown in FIG. 1) of storage banks 34 and sense amplifier arrays 58. DRAM 18 may also include other components not shown in FIG. 1, such as row and column decoders and so on. In some embodiments, each memory bank 34 has coupled therewith a sense amplifier array 58 for sensing data. In some other embodiments (not shown), each memory bank 34 shares a sense amplifier array with another bank.

The decoder 72 within the command interface 25 of DRAM 18 is used to receive and decode command packets from the memory controller 12. For instance, upon receiving an auto-refresh command from the memory controller 12, decoder 72 issues the appropriate signals to the refresh circuitry 35 so as to perform a refresh operation.

The refresh circuitry 35 is configured to control auto-refresh operations of the DRAM 18 in response to an auto-refresh command applied to the DRAM 18 from the controller 12. It may be necessary to refresh each row in DRAM 18 once per auto-refresh interval ("tREF"). For instance, it may be necessary to periodically sense (read) and rewrite each cell in the DRAM in a refresh operation to prevent loss of data that is stored in memory banks 34 of the DRAM 18. According to one embodiment, auto-refresh operations are initiated in response to an auto-refresh command received from the memory controller 12.

Figure 7:
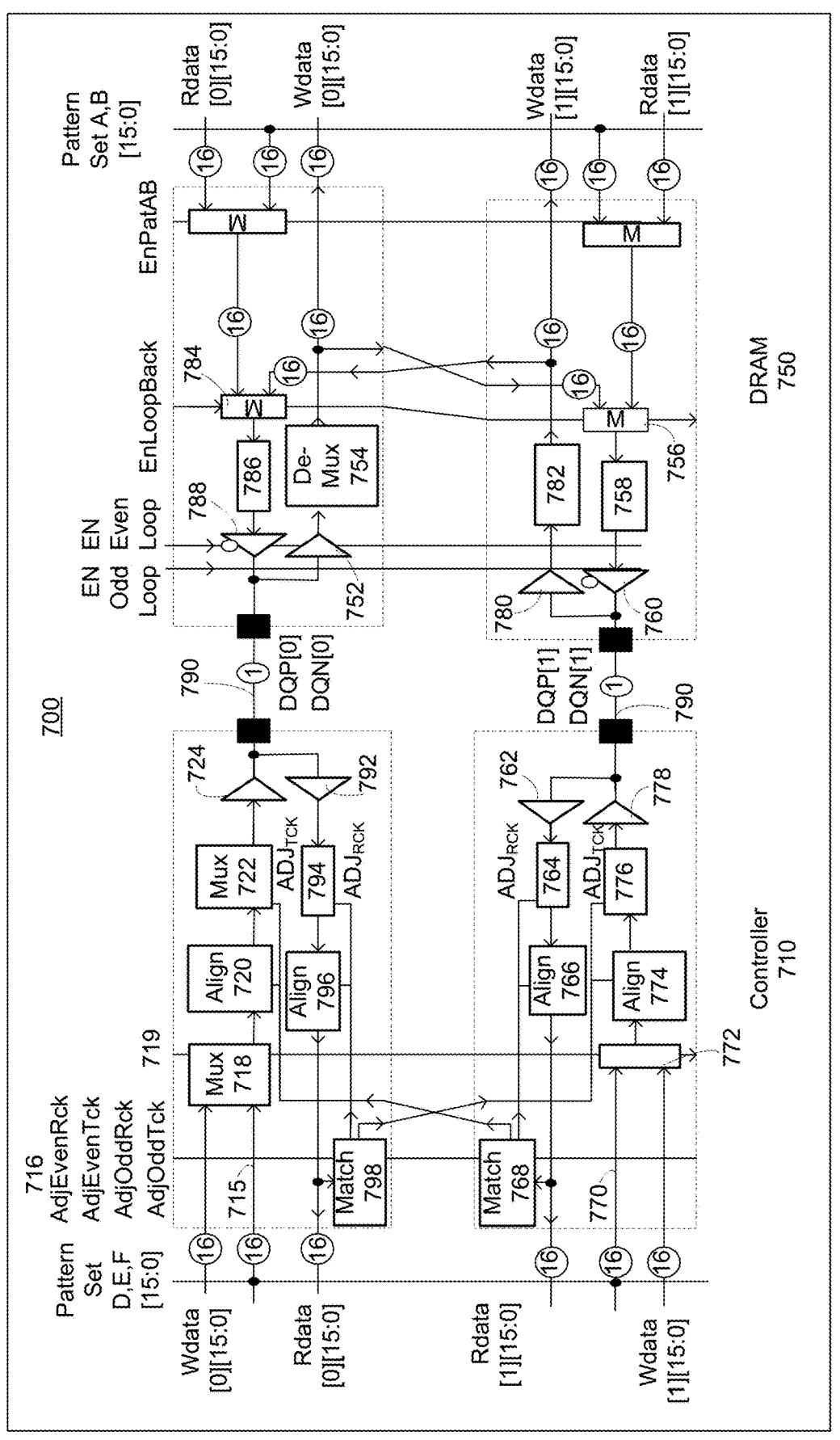
FIG. 7 is a block diagram of a system for performing timing calibration after issuing an auto-refresh command.

The decoder 72 within the command interface 25 of DRAM 18 also decodes an auto-refresh command containing calibration command information from the memory controller 12. Decoder 72 issues the appropriate signals (e.g., ENCalib signal discussed with reference to FIGS. 11, 12, 14 and 15, and signals ENLoopBack, ENEvenLoop, and ENOddLoop to enable loopback mode, as illustrated in FIG. 7) to appropriate calibration circuitry (e.g., as illustrated in FIGS. 7, 11, 12, 14 and 15) so as to perform the calibration operations. Furthermore, because a calibration operation may take more than one auto-refresh cycle to complete, control logic 70 includes a state machine 74 to track which step in the calibration operation is to be performed next.

In one embodiment, as discussed further with reference to FIGS. 16-20, the auto-refresh command includes a memory bank order specifying an order in which the memory banks 34 are to be refreshed.

Alternatively, or in addition, in some embodiments, the auto-refresh command includes a sub-operation code, which is decoded by control logic 70, to place the command interface 25 of the DRAM 18 into a calibration mode for the duration of (or, alternately, at least a portion of) the time interval during which refresh circuitry 35 is performing auto-refresh operations in response to the auto-refresh command. The control logic, in response to the auto-refresh command, configures the command interface 25 to not accept commands from the memory controller and to instead enter a calibration mode for at least a portion of the time interval. In some embodiments, not accepting commands includes disabling execution of the commands. Accordingly, during the time interval ("tRFC") while the DRAM 18 is performing refresh operations, a calibration of the command interface 25 of the DRAM 18 is concurrently performed. An embodiment of an auto-refresh command that includes a calibration sub-operation code is discussed further with reference to FIG. 3B.

In some embodiments, in order to perform calibration, the command interface 25 enters a loopback mode, in which the command interface 25 receives a pattern on a first data path, and transmits the data pattern to the memory controller on a second data path.

Although shown as being included within command interface 25, refresh circuitry 35 may, in part, or entirely, be separate from the command interface 25. An embodiment of an auto-refresh command that includes a memory bank order is discussed further with reference to FIG. 16. An embodiment of refresh circuitry 35 is discussed further with reference to FIG. 18.

Memory Controller

Figure 2:
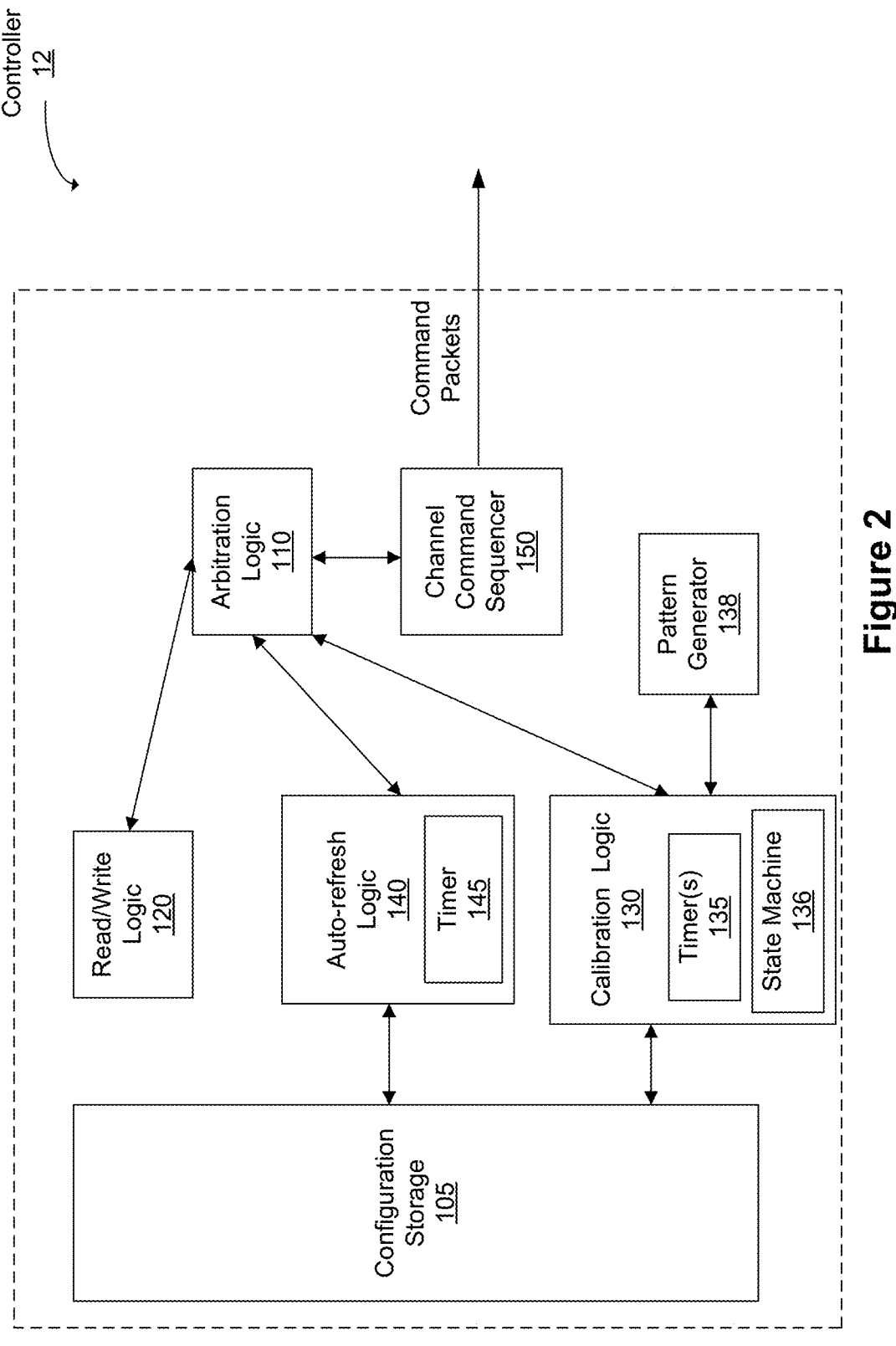
FIG. 2 is a block diagram of a memory controller for performing DRAM maintenance operations.

FIG. 2 is a block diagram of a memory controller 12 according to some embodiments of the invention. The memory controller 12 includes configuration storage 105, arbitration logic 110, read/write request logic 120, calibration logic 130, auto-refresh logic 140 and a channel command sequencer 150. In some embodiments, the auto-refresh logic 140 includes a refresh timer 145 and the calibration logic 130 includes a calibration timer 135. Memory controller 12 may also include a pattern generator 138 for generating patterns used for calibration of the command interface 25 of DRAM 18. Memory controller 12 may have a subset of the components shown in FIG. 2, and may also include additional components not shown in FIG. 2. Functions of two or more components may be implemented in a single component.

Configuration storage 105 stores memory configuration parameters, such as the number of DRAM devices in a memory subsystem, such as subsystem 10, the number of memory banks per DRAM, the number of rows of cells per memory bank, the time interval within which each row of a DRAM must be refreshed (tREF), the time interval between auto-refresh commands, and so on. Memory configuration parameters may be written to the configuration storage 105 during system initialization. The configuration storage 105 may also be programmed with policy control parameters that are used to prioritize requests received by the channel command sequencer 150 and the arbitration logic 110.

Arbitration logic 110 receives requests to issue commands to DRAM devices from the read/write request logic 120, the auto-refresh logic 140 and the calibration logic 130. The arbitration logic 110 selects from among these competing requests based on the policy control parameters received from the configuration storage 105 and forwards a prioritized stream of transaction requests to the channel command sequencer 150. Channel command sequencer 150 is a state machine that generates and outputs command packets on the channel, such as channel 16, according to the stream of transaction requests from the arbitration logic and based on policy control parameters received from the configuration storage 105.

Auto-refresh logic 140 issues a request to perform a multi-bank auto-refresh each time the refresh timer 145 expires. Refresh timer 145 may be programmed to have a timeout interval equal to approximately the storage cell retention time (tREF) (tREF typically has values in the range of 16 to 64 milliseconds) divided by the number of rows in each bank of the memory devices 18 whose memory cells are being refreshed. This calculation assumes that a portion of every memory bank is refreshed at each timeout event (such as, one row in each bank). Auto-refresh logic 140 determines a bank order according to which banks in a DRAM 18 are to be refreshed. The multi-bank auto-refresh request causes the channel command sequencer 150 to issue a single auto-refresh command, which is broadcast to a DRAM device, such as DRAM 18a in the memory subsystem 10. In some embodiments, the auto-refresh command specifies a bank order. An embodiment of an auto-refresh command that specifies a bank order is discussed further with reference to FIG. 16.

Calibration logic 130 issues a request to perform a calibration of the command interface 25 of DRAM 18. Calibration logic 130 issues a request to perform a calibration of the command interface 25 of DRAM 18 each time the calibration timer 135 expires. Calibration timer 135 is linked to the refresh timer 145, such that the calibration timer 135 expires at least whenever the refresh timer 145 expires. In other embodiments, the calibration timer 135 and the refresh timer 145 may be the same timer. Calibration request causes the channel command sequencer 150 to incorporate a sub-operation code indicative of the calibration command into the auto-refresh command, which is broadcast to each DRAM in the memory subsystem 10. An embodiment of an auto-refresh command that includes a calibration sub-operation code is discussed further with reference to FIG. 3B.

General Command Interface Calibration &
Loopback

Figures 3A, 3B:
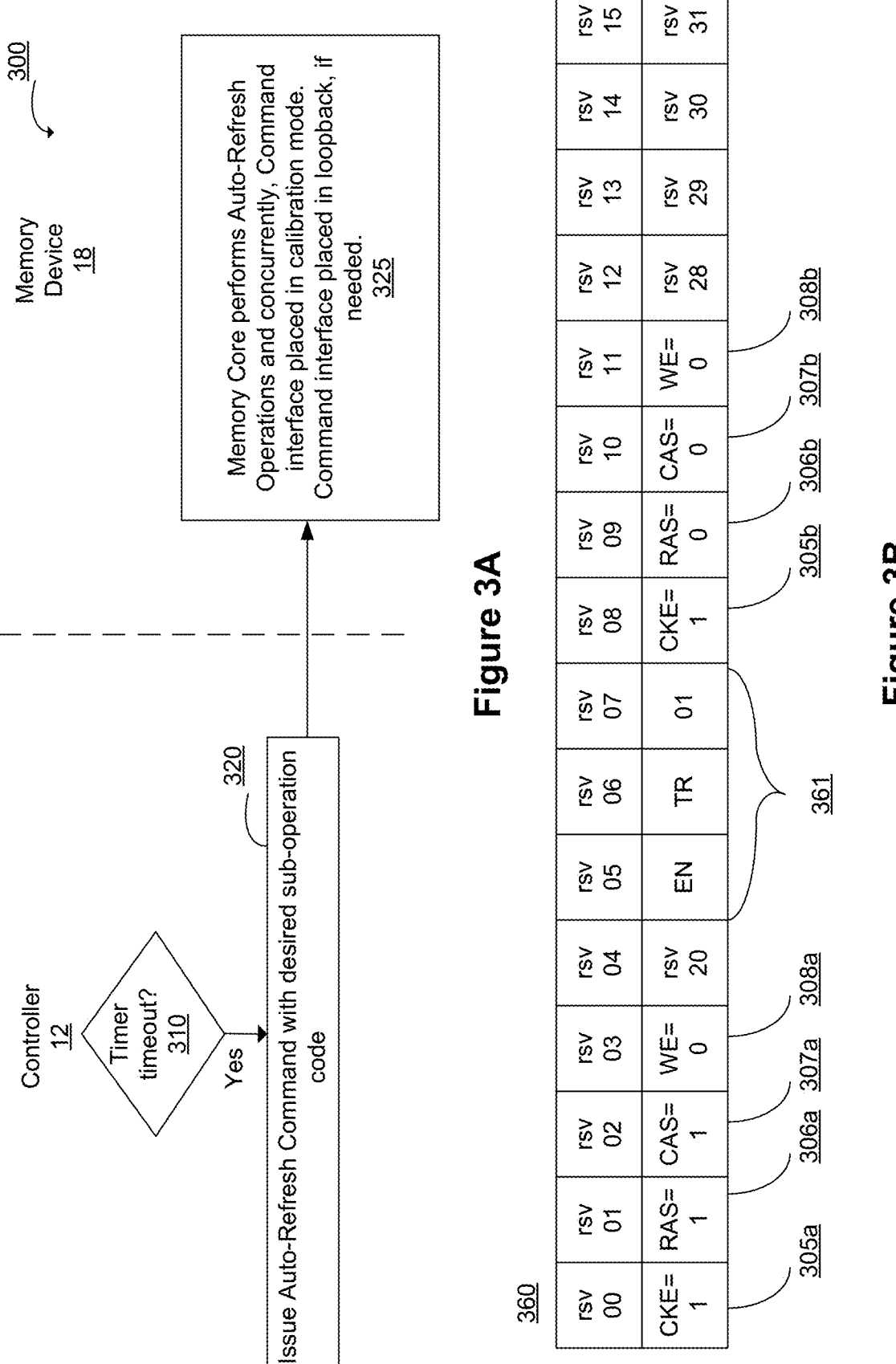
FIG. 3A is a flow diagram of a process for performing DRAM maintenance operations.
FIG. 3B illustrates an auto-refresh command with a sub-operation code.

FIG. 3A is a flow diagram of a command interface calibration process 300, which can be performed for periodic calibration.

Initially, at 310, a timer (e.g., timer 135) within calibration logic 130 times out to indicate that it is time to perform a calibration operation. In the calibration mode, at least one of the following maintenance operations may be performed during the calibration operation: periodic timing calibration, output drive strength periodic calibration, On-Die Termination (ODT) periodic calibration, input offset voltage periodic calibration, and equalization periodic calibration. Calibration logic 130 performs at least one of the aforementioned maintenance operations each time the auto-refresh command is issued to cause DRAM 18 to perform auto-refresh operations. Calibration logic 130 can determine that at least one of the aforementioned maintenance operations should be performed more often than the other maintenance operations. In some embodiments, the calibration logic 130 initiates the performance of a calibration operation less often than the auto-refresh logic 140 initiates an auto-refresh operation. In these embodiments, the calibration logic 130 initiates performance of a calibration operation at a subset of the times that an auto-refresh command is sent to a respective DRAM 18 to auto-refresh its memory cells.

In order to perform a calibration operation with simultaneous refresh of the memory core, the controller 12 needs to effectively match the refresh pipeline with the amount of time needed to perform a desired calibration. In some embodiments, the calibration logic 130 of the controller 12 has several calibration timers 135 and when one of them times out, the controller 12 waits for the next refresh, estimates the time it will take to perform one or more calibration operations, and fits one or more desired calibration operations into the refresh time interval, tRFC. In other embodiments, when calibration timer 135 times out, the controller 12 waits for the next refresh, estimates the time it will take to perform a desired calibration operation, and splits the desired calibration operation into multiple chunks to be performed over the next few refresh cycles. Calibration logic 130 may include a state machine 136 to track which step or chunk in the current calibration operation is to be performed next.

Further, in some embodiments, the desired calibration operation is determined based on configuration information stored in configuration storage 105, such as upon initialization. In some embodiments, the desired calibration operation is determined on the fly. For instance, periodic timing calibration may be required to "calibrate out" changes in propagation delay, which may vary as a function of temperature, voltage, process and loading variations.

Figure 5:
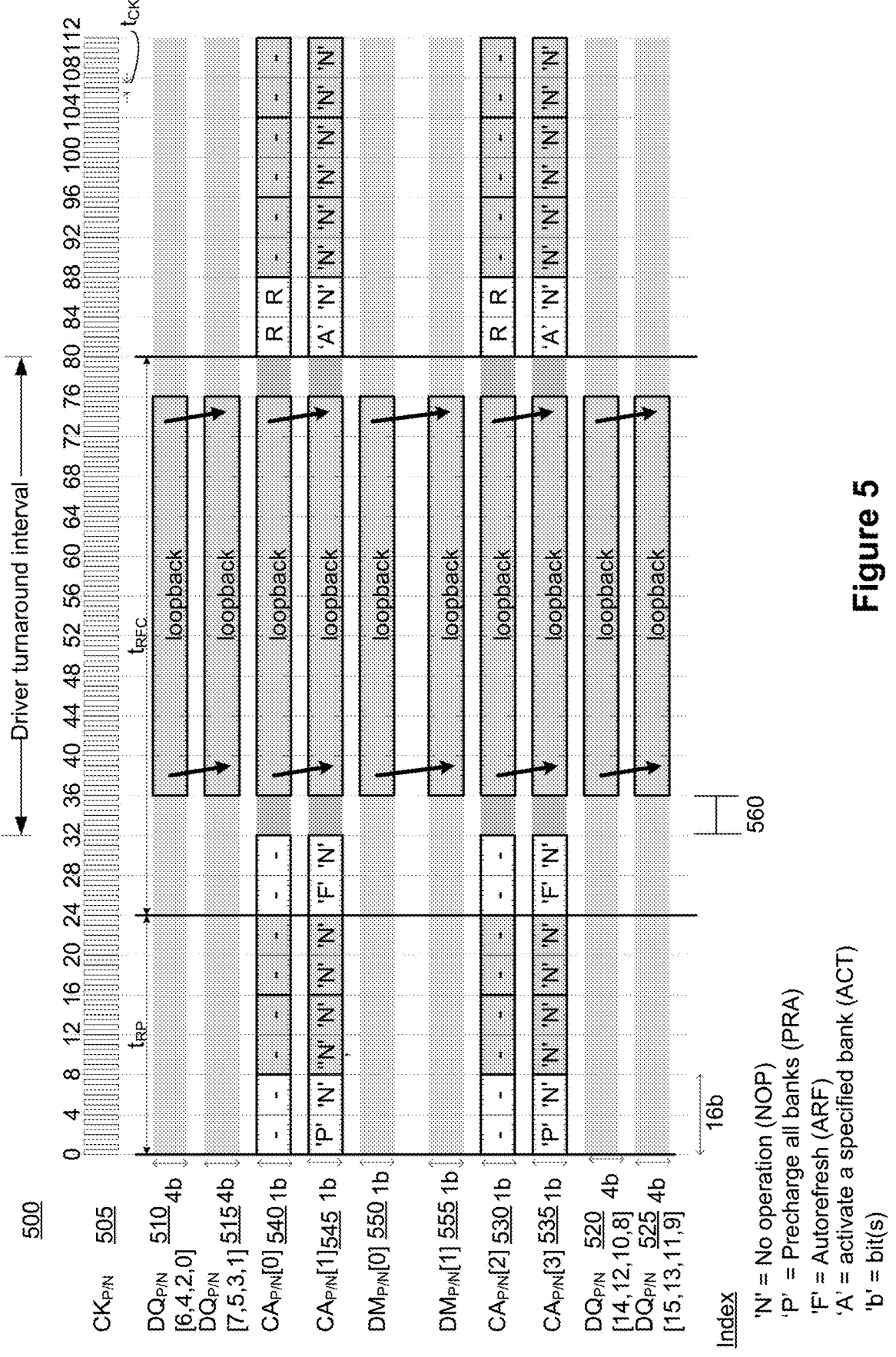
FIG. 5 is a timing diagram that illustrates a controller and a DRAM in loopback mode.

Calibration process 300 includes transmitting an auto-refresh command from the memory controller 12 to the memory device 18, at 320. The auto-refresh command contains a sub-operation code that can be decoded by decoder 72 at the DRAM 18 to determine which type of command interface calibration (e.g., phase calibration, ODT calibration, and so on) is to be performed. During calibration, command interface 25 of the DRAM 18 is offline, such that the memory core 19 cannot be accessed by controller 12, and no address decoding and no sense amp driving operations are performed. Further, during calibration, both command address (CA) lines and data links (DQ) are calibrated. Responsive to the auto-refresh command, during a first time interval (tRFC), DRAM 18 performs auto-refresh operations of its memory cells, at 325. In some embodiments, auto-refresh command includes sub-operation code, such that, responsive to the auto-refresh command, the command interface 25 of the DRAM 18 is placed into a loopback mode for at least a portion of the duration of the first time interval, at 325, as illustrated in FIG. 5.

In some embodiments, the auto-refresh command contains code that can be decoded by decoder 72 at the DRAM 18 to enable the command interface 25 to enter a calibration mode, and the state machine 74 determines which type of command interface calibration (e.g., phase calibration, ODT calibration, and so on) is to be performed. In some embodiments, the auto-refresh command contains a field to specify which calibration operation is to be performed during the refresh interval.

Calibration process 300 includes performing a calibration of the command interface 25 of the DRAM 18 during the time interval (tRFC) (for at least a portion of), at 325, concurrently with the refresh operations being performed by the DRAM 18.

For instance, in the case of a timing calibration, controller 12 transmits a pattern to the command interface 25 of the DRAM 18 on a first data path. The pattern may be generated by pattern generator 138 of the memory controller 12. The command interface 25 of the DRAM 18 receives the pattern transmitted by the memory controller 12. While the DRAM 18 core (comprised of the memory banks 34) is busy performing the auto-refresh operations, the command interface 25 of the DRAM 18 concurrently transmits the received pattern on a second data path back to the memory controller 12. At the controller, the pattern from the command interface 25 of the DRAM 18 on the second data path is received. The timing calibration process is discussed in greater detail below with reference to FIGS. 6-9.

Thus, responsive to the auto-refresh command, during a first time interval, DRAM 18 performs refresh operations to refresh the memory cells. Additionally, concurrently, during at least a portion of the first time interval while the DRAM 18 is performing the refresh operations, the command interface 25 of DRAM 18 is placed into a calibration mode for at least a portion of (or, alternately, the duration of) the first time interval in response to a sub-operation code in the auto-refresh command. In some embodiments, the command interface 25 of DRAM 18 includes both command/address links (CA) and data links (DQ). Concurrently, during the first time interval while the memory device is performing refresh operations, the calibration logic 130 performs a calibration of the command interface of the memory device. In the calibration mode, command interface 25 of DRAM 18 does not accept commands from the memory controller 12, while in a normal non-calibration mode, command interface 25 of DRAM 18 accepts commands from the memory controller 12. Stated in another way, during the first time interval (which may also be called the auto-refresh interval or the calibration interval), after receipt of the auto-refresh command (ARF) the command interface 25 of the DRAM 18 ignores any commands on the command/address links (CA) until termination of the first time interval. In this way, the command interface 25 of DRAM 18 is freed to carry out maintenance operations, while the memory core, such as core 19, is involved in the refresh operations.

Some calibration operations, such as the periodic transmit and receiving timing calibration operations discussed herein are performed over multiple auto-refresh cycles. For such calibration operations, the calibration logic 130 in the memory controller 12 keeps track of the progress of a respective multi-cycle calibration operation and resumes performance of the respective calibration each time that a new auto-refresh command is sent, until the respective calibration operation is completed.

Furthermore, while the techniques described herein are for periodic calibration, they can also be used for initial calibration. In some embodiments, initial calibration can be performed using techniques described herein, such as by performing periodic calibration multiple times and/or over intervals that are longer than those afforded by refresh operations.

FIG. 3B shows an embodiment of an auto-refresh (ARF) command 360 that includes a sub-operation code. Auto-refresh command 360 has thirty-two fields 00-31, including reserved fields 00-15 and 28-31 marked "rsv," fields 305a and 305b specifying a value of a Clock enable signal CKE for determining whether clock signal CK supplied to a clock generator in the DRAM 18 is valid or invalid, fields 306a and 306b specifying a value of a row address strobe signal RAS, fields 307a and 307b specifying a value of a column address strobe signal CAS, and fields 308a and 308b specifying a value of a write enable signal WE. A command is specified by a combination of logic levels of respective signals (CKE, RAS, CAS, WE). For example, the combination (CKE=1, RAS=1, CAS=1, and WE=0) constitutes the auto-refresh operation, whereas the combination (CKE=1, RAS=0, CAS=0, and WE=0) constitutes a No Operation (NOP) command.

Command 360 includes a sub-operation code 361 (sometimes called a calibration code or calibration mode) that specifies a calibration process or mode for the command interface of the memory device (discussed further with reference to FIGS. 6-9). For instance, to initiate timing calibration, sub-operation code 361 includes an "EN" code that enables calibration mode during the auto-refresh (ARF) operation, a "TR" code that specifies transmit or receive calibration, and an odd/even code (labeled "01") to specify whether the calibration operation is to calibrate odd or even DQ/CA/DM links. In some embodiments, more bits may be used for the "EN" code to encode more calibration modes. For instance, up to six bits may be used for the "EN" code. The "EN" code is decoded by control logic 70 of the command interface 25 of the memory device 18 to generate a plurality of "ENCalib" signals, only one of which is enabled at any one time (during performance of an auto-refresh operation by the memory device) so as to enable one of the calibration circuits within the memory device 18.

Figure 4:
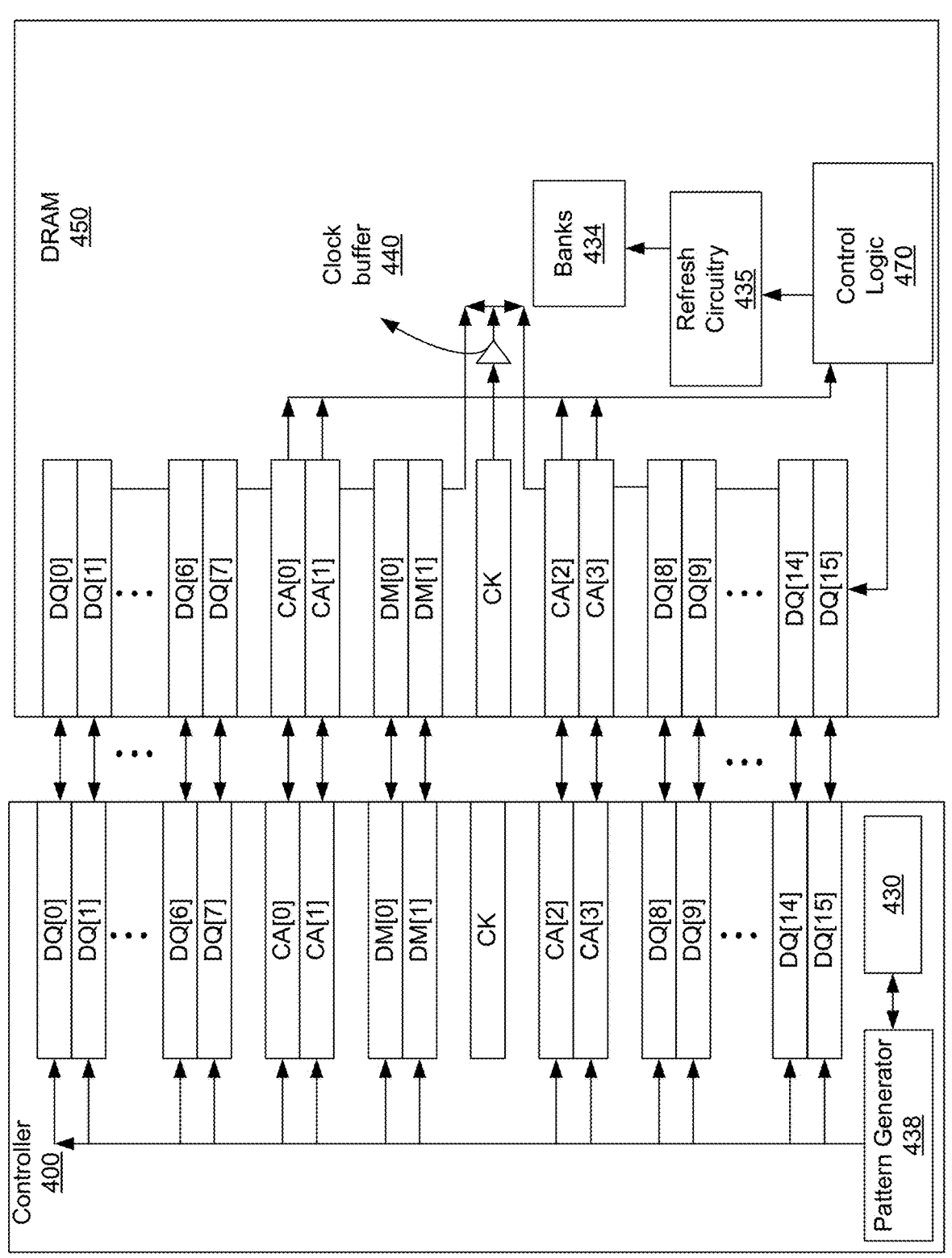
FIG. 4 is a block diagram of a controller and a DRAM in loopback mode.

FIG. 4 illustrates a block diagram of a memory subsystem 401 when a command interface of a DRAM 450 is placed in loopback mode for calibration of the command interface. In the controller 400, each DQ, CA and DM pair of signal lines is linked to couple to the pattern generator 438, and the calibration logic 430. The DM signal is a data mask signal, and is used by the DRAM 450 for byte masking of the incoming write data. DQ signal lines are the data lines, while the CA signal is a command address signal.

In the DRAM 450, each command interface link (each DQ, CA and DM pair) is linked to form a loopback path during loopback mode. In some embodiments, an auto-refresh command is decoded by control logic 470 to place the command interface links in a loopback path, while concurrently, the auto-refresh command causes a burst of refresh operations to be generated by refresh circuitry 435 on banks 434. FIG. 4 also illustrates a clock buffer 440, which is discussed further with reference to FIGS. 6 and 7. During the first time interval (also called the auto-refresh interval or the calibration interval), after receipt of the auto-refresh command (ARF), the control logic 470 of the DRAM 18 ignores (or, equivalently, does not accept) any commands sent by the memory controller 400 on the command/address links (CA) until termination of the first time interval.

FIG. 5 is a prophetic timing diagram 500 that illustrates operation of the command interface 25 of DRAM 18 in loopback mode according to one embodiment. In the embodiment in FIG. 5, the CA, DQ, and DM links all participate in the loopback calibration process and are not used to communicate valid control-address, data, or data mask information respectively.

The timing diagram 500 illustrates a clock signal 'CK' 505 having a clock cycle "$t_{CK}$", which in some embodiments is equal to 0.625 nanoseconds (ns). Arrows in the timing diagram 500 show the loopback direction between even DQ links 510 and odd DQ links 515, and between even DQ links 520 and odd DQ links 525. The loopback direction between odd DQ links 515 and even DQ links 510 and between odd DQ links 525 and even DQ links 520 is in the reverse direction (not shown). As evident from FIG. 5, because the command interface 25 of the DRAM 18 is in calibration mode, there is no data on the DQ links 510, 515, 520 and 525. The timing diagram 500 illustrates the loopback direction between even DM link 550 and odd DM link 555. As evident from FIG. 5, because the command interface 25 of the DRAM 18 is in calibration mode, there is no data mask signal on the DM links 550 and 555.

Arrows in the timing diagram 500 also show the loopback direction between even CA links 530 and odd CA links 535 and between even CA links 540 and odd CA links 545. The loopback direction between odd CA links 535 and even CA links 530 and between odd CA links 545 and even CA links 540 is in the reverse direction (not shown). Issued on the CA link 535 and 545 is the precharge-all-banks command (PRA) and the auto-refresh command (ARF) to initiate the auto-refresh of memory cells in the DRAM 18. After the auto-refresh operations are completed, the activate normal data access operations command (ACT) is issued on the CA links 535 and 545, as shown in FIG. 5. The ACT command disables loopback mode and re-enables the command interface 25 to interpret new commands from memory controller 12. The NOP command refers to no operation.

Illustrated in FIG. 5 are three time intervals. A time interval $t_{RP}$ refers to a time that it takes to precharge all memory banks before the ARF command can be issued. A time interval tRFC is a predefined interval during which the memory core is being auto-refreshed and during which, concurrent to the auto-refresh operations, the command interface 25 is placed in a loopback mode for calibration operations by the memory controller 12. A third time interval referred to as a "driver turnaround interval" is also shown. The driver turnaround interval is a time interval during which the command interface 25 of DRAM 18 is offline and does not accept any commands from the memory controller 12. Also shown is a timing margin 560, which is used by the memory controller to make sure that the loopback path has been enabled before it begins calibration operations. In some embodiments, timing margin 560 is equal to zero.

Periodic Timing Compensation Calibration

Referring back to FIG. 4, DRAM 40 includes an uncompensated clock buffer 440, which buffers a clock signal received from the controller 400, and drives the buffered clock signal across the command interface so as to supply the clock signal needed for sampling data from the memory controller and for driving data across a channel to the memory controller. The clock signal received at the DRAM 450 may have a phase that is offset from the phase of the clock signal at the controller 400. Periodic timing calibration, thus, may be required to "calibrate out" changes in propagation delay. The delay may vary as a function of temperature, voltage, process and loading variations. Performing the timing calibration tracks a delay of the clock signal to the clock buffer 440.

Figure 6:
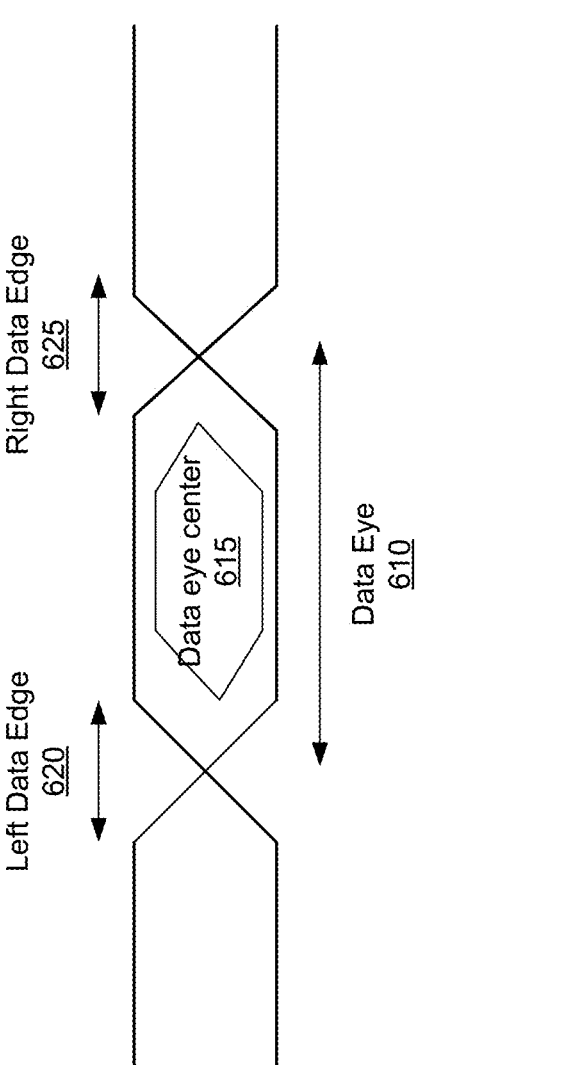
FIG. 6 illustrates a data signal pattern that may be used in a timing calibration process.

FIG. 6 illustrates a data signal 600 that may be used as a pattern for transmission by a controller. Data signal 600 has a data eye 610 having a data eye center 615. A data eye 610 is a portion or time period of a data signal 600 where typically a data value associated with the data signal 600 is observed or sampled. A data value may be associated with a voltage value or current value. A data eye 610 has edges formed in left hand side data edge fuzz band 620 and right hand side data edge fuzz band 625, where a data signal may transition from one data value or logic state (e.g., logic 1) to another data value or logic state (e.g., logic 0). The edges 620 and 625 and the center 615 of the data eye 610 move together, but the edge is where the signaling event occurs. A receiving device, such as a memory device 18, tracks the signaling event (the transitions from 0-1 and 1-0), and as that transition point moves around, the center 615 of the data eye 610 will move a corresponding amount. Sampling at the eye edge results in occasional mismatches, but sampling at the center 615 is typically very reliable since it has margin in both time (horizontal dimension of FIG. 6) and signal level (vertical dimension of FIG. 6).

In some embodiments, as described with reference to FIGS. 7-9, for periodic calibration, instead of finding both edges of the data eye and averaging (as could be performed for initial calibration), a single edge of the eye is tracked.

Figure 8:
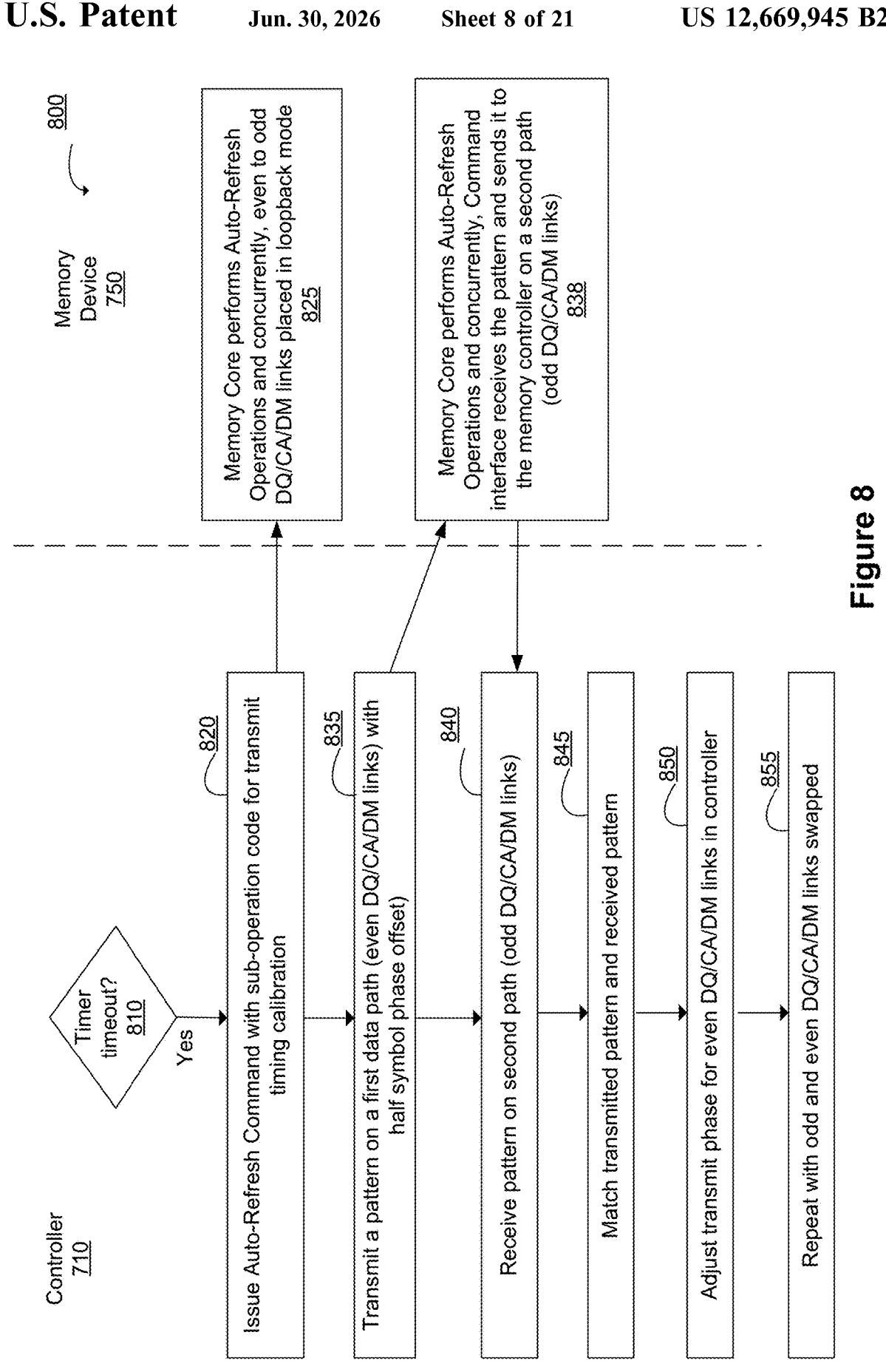
FIG. 8 is a flow diagram of a memory controller performing periodic transmit phase calibration after issuing an auto-refresh command.
Figure 9:
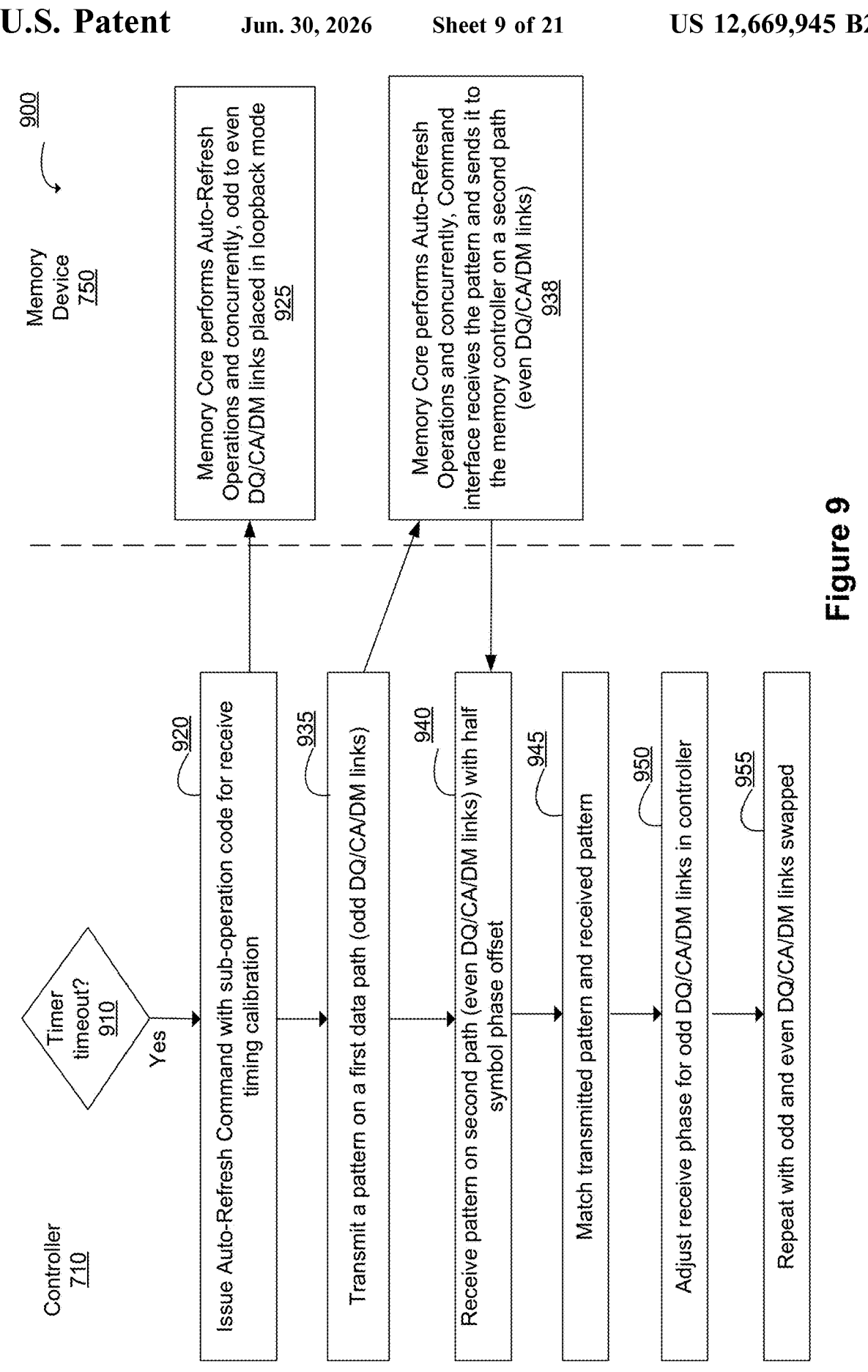
FIG. 9 is a flow diagram of a memory controller performing periodic receive phase calibration after issuing an auto-refresh command.

FIGS. 7, 8 and 9 illustrate a system and method for performing periodic timing calibration of a command interface of a DRAM by a memory controller. FIG. 7 illustrates an example of a memory system 700 that maintains transmit and receive phase values and performs timing calibration processes 800 and 900, discussed below with reference to FIGS. 8 and 9. FIG. 8 is a flow diagram of a command interface transmit timing calibration process 800 to adjust timing associated with transferring write data from memory controller 710 to the memory device (DRAM) 750. FIG. 9 illustrates a flow diagram of a command interface receive timing calibration process 900 to adjust timing associated with receiving read data at the memory controller 710 from the memory device 750. The timing calibration processes 800 and 900 are preferably performed at regular intervals, concurrently with auto-refresh of the memory core.

Memory system 700 includes a controller 710, a memory device (e.g., DRAM device) 750 and a channel 790. Memory system 700 includes bit aligner blocks 720 and 774 in controller 710. These bit aligner blocks 720 and 774 perform a bit alignment operation so that the write data (Wdata) or pattern data (on paths 715/770) are framed identically in both the controller 710 and the DRAM 750. In some embodiments, the bit aligner blocks 720 and 774 include logic that shifts the write data (Wdata) or pattern data by zero to fifteen bit positions. The correct number of bit shifts could be chosen by comparing the transmitted and received information. A bit shift is equivalent to 360 degrees of bit phase. In some embodiments, the bit aligner blocks 720 and 774 include logic to delay the data by zero to fifteen bit times. The delay values for the controller 710 are set during an initialization process and are maintained by the periodic calibration process, as discussed with reference to FIGS. 8 and 9.

Controller 710 includes match circuitry 768/798, which includes compare logic, digital phase values, and phase interpolators, and outputs the phase adjusted clocks $ADJ_{TCK}$ and $ADJ_{RCK}$ to the serializer (Mux) block 722 and deserializer block 794 (also called a demultiplexer).

Match circuitry 768/798 is a comparison circuit that performs a comparison between a captured data word and the transmitted data pattern. When calibration is done, the transmit or receive phase is deliberately offset by a fraction of a tBIT time (typically tBIT/2 or tBIT/4) and the comparison of the received pattern versus expected pattern by match circuitry 768/798 is made at this offset point. This offset point tracks the edge of the data eye, and the center of the eye will move with the edge because of the fixed offset. Calibrating a respective phase adjusted clock, which includes adjusting the phase, transmitting and receiving the pattern, and readjusting the phase, takes time and consumes a valuable resource—the interface resource of the memory device. Therefore, overlapping the calibration operation (which consumes the interface resource) with the refresh operation (which consumes the core resource) is beneficial.

In some embodiments, each match circuit 768/798 includes a phase adjuster that outputs an adjusted clock signal ($ADJ_{CK}$) and a comparison circuit. The phase adjuster receives a reference clock signal and an up/down signal from the comparison circuit, and produces the adjusted clock signal. The adjusted clock signal has the same frequency as the reference clock signal and a phase that is adjusted based on the up/down signals received from the comparison circuit over multiple calibration cycles. The comparison circuit compares the expected data pattern with the received data pattern, which results in digital "early" or "late" values that are filtered and then used to produce an up/down signal that is provided to the phase adjuster so as to increase or decrease the phase of the adjusted clock signal produced by the phase adjuster.

Match circuit 768 outputs an adjusted transmit clock signal $ADJ_{TCK}$ having an adjusted transmit phase. The operation of match circuit 768 is further described in reference to FIG. 8. Match circuit 798 outputs an adjusted receive clock signal $ADJ_{RCK}$ having an adjusted receive phase. The operation of match circuit 798 is further described in reference to FIG. 9.

In response to one of the four signals 716 shown in FIG. 7, a timing calibration is performed, as discussed with reference to FIGS. 8 and 9. The signals 716 are control signals which select what type of timing calibration is to be performed. A signal "AdjEvenRck" means that even bits (e.g., DQ[0]) are to be calibrated and that the receive phase is to be adjusted on the controller 710 for read data. A signal "AdjEvenTck" means that even bits (e.g., DQ[0]) are to be calibrated and that the transmit phase is to be adjusted on the controller 710 for write data. A signal "AdjOddRck" means that odd bits (e.g., DQ[1]) are to be calibrated and that the receive phase is to be adjusted on the controller 710 for read data. A signal "AdjOddTck" means that odd bits (e.g., DQ[1]) are to be calibrated and that the transmit phase is to be adjusted on the controller 710 for write data.

Process 800 (FIG. 8) illustrates a controller 710 performing transmit timing calibration to adjust timing associated with transferring write data from the memory controller 710 to the memory device 750. Process 800 is similar to process 300, except, that at 820, the controller 750 issues an auto-refresh (ARF) command that enables a loopback mode for even-to-odd DQ, CA and DM links of the command interface of DRAM 750. The ARF command issued at 820 includes a sub-operation code, which is decoded at DRAM 750 to place the even-to-odd DQ, CA and DM links in loopback mode, at 825. In one embodiment, the sub-operation code of the ARF command (for transmit timing calibration) is EN=1000 (transmit timing calibration enabled), TR=1 (transmit calibration) and Odd/Even(0/1)=1 (Even). The ARF command is also decoded at the DRAM 750 to initiate auto-refresh operations of memory banks in the DRAM 750.

At 835, the controller 710 transmits a known calibration pattern on a first data path, which includes the even DQ/CA/DM links of the channel 790, with the phase of the transmitted data adjusted by one-half of a symbol period (sometimes denoted as 0.5 UI) relative to the previously calibrated transmit phase for the DQ/CA/DM links. Referring to FIG. 7, in some embodiments a plurality of patterns D, E and F are available, of which one is selected by a multiplexer 718 for further transmission based on selection signal 719. The selected pattern is transmitted over the first data path, which includes a bit aligner 720, a multiplexer 722 (e.g., a 16-to-1 multiplexer), and a transmitter 724. The selected pattern is then transmitted over the even DQ/CA/DM links of the channel 790 to the DRAM device 750 at the other end of the channel 790.

Controller 710 transmits a known calibration pattern (e.g., a 16 bit pattern), but instead of transmitting the pattern at its previously calibrated sampling point, such as in the data eye center 910, a bit aligner 720 deliberately shifts the data over to the edge of the data eye using knowledge of the last calibrated sampling point and phase for the edge. By shifting to the edge of the data eye, the process 800 attempts to keep track of the edge of the data eye in the transmitted signals.

The selected pattern is transmitted over the even DQ/CA/DM links onto channel 790 to DRAM 750, where it is received by receiver 752 and travels through a demultiplexer 754 (e.g., a 1-to-16 demultiplexer). In some embodiments, the channel 790 operates at a data rate of approximately 6.4 Gigabits per second (Gb/s), while the individual DQ/CA/DM links of controller 710 and DRAM 750 operate at a data rate of approximately 0.4 Gb/s. Stated in another way, the channel 790 (made of the DQ/CA/DM links) operates at an aggregate data rate of 6.4 Gb/s, while the individual parallel buses (Rdata and Wdata) operate at a data rate of 0.4 Gb/s.

At 838, the DRAM 750 receives the transmitted pattern, and then transmits the received pattern over a second path, while concurrently the DRAM 750 is performing auto-refresh operations of its memory cells. Referring to FIG. 7, the second data path comprises a multiplexer 756 that receives an enable loopback signal, a multiplexer 758 (e.g., a 16-to-1 multiplexer), and a transmitter 760 that transmits the pattern over the channel 790 to controller 710. In some alternate embodiments, transmit path calibration is broken into two steps in order to fit them into the narrow time window afforded by refresh, and in those embodiments the DRAM command interface includes registers to store the test pattern received from the controller 710.

At 840, controller 710 receives the pattern on the second path that comprises the odd DQ/CA/DM links. The pattern is received at the controller 710 with 0-UI offset. Referring to FIG. 7, the second data path further includes a receiver 762, a demultiplexer 764 (e.g., 1-to-16 demultiplexer), and a bit aligner 766. In this way, the controller 710 captures a 16-bit data word on the odd DQ/CA/DM links.

At 845, a comparison between the captured data word and the transmitted data pattern is performed. For example, the comparison may be performed using a match circuit 768 (FIG. 7). At 850, based on whether comparison produces a match or no-match result, controller 710 either increments or decrements the transmit phase used by the controller 710 to transmit signals onto the DQ/CA/DM links. Match circuit 768 outputs an adjusted transmit clock signal $\text{ADJ}_{TCK}$ with an adjusted transmit phrase. Signal $\text{ADJ}_{TCK}$ is provided to bit aligner 720 and multiplexer 722. The transmit phase adjustment moves the data eye center, as observed at the DRAM device 750 to which signals are transmitted on the DQ/CA/DM links. At 855, the controller 710 repeats the transmit timing calibration process with the odd and even DQ/CA/DM links swapped thereby adjusting the transmit phase used by the controller 710 to transmit signals onto the odd DQ/CA/DM links. During operation 855, match circuit 798 outputs adjusted transmit clock signal $\text{ADJ}_{TCK}$ to multiplexer 776 and bit aligner 774. Repeated performance of process 800 over time results in a series of incremental adjustments to the transmit phase and corresponding movements of the data eye center, which keeps the sampling point for signals transmitted on the DQ/CA/DM links optimized.

FIG. 9 illustrates a flow diagram of a command interface receive timing calibration process 900 to adjust timing associated with receiving read data at the memory controller 710 from the memory device 750. The timing calibration processes 800 and 900 are preferably performed at regular intervals, concurrently to auto-refresh of the memory core.

Process 900 is similar to process 800, except, that at 920, the controller 710 issues an auto-refresh (ARF) command that enables loopback mode burst for odd-to-even DQ, CA and DM links of the command interface of DRAM 750. In some embodiments, the ARF command includes a sub-operation code, which is decoded at DRAM 750 to place the odd-to-even DQ, CA and DM links in loopback mode, at 925. In one embodiment, the sub-operation code of the ARF command (for receive timing calibration) is EN=0100 (receive timing calibration enabled), TR=0 (receive calibration) and Odd/Even(0/1)=0 (Odd). The ARF command is also decoded at the DRAM 750 to initiate auto-refresh operations of memory banks in the DRAM 750.

At 935, the controller 710 transmits a known calibration pattern on a first data path, including the odd DQ/CA/DM links of the channel 790, without any phase adjustment to the pattern. Referring to FIG. 7, in some embodiments, a plurality of patterns D, E and F are available for transmission over the odd DQ links 870 of channel 790. One of the patterns is selected by a multiplexer 772 for further transmission based on selection signal 719. The selected pattern is transmitted over the first data path, which includes a bit aligner 774, a multiplexer 776 (e.g., a 16-to-1 multiplexer), a transmitter 778. The selected pattern is then transmitted over the odd DQ/CA/DM links of channel 790 to DRAM 750, where it is received by receiver 780 and travels through a demultiplexer 782 (e.g., a 1-to-16 demultiplexer).

At 938, the DRAM 750 transmits the received pattern over a second path, while concurrently the DRAM 750 is performing auto-refresh operations of its memory cells. Referring to FIG. 7, the second data path comprises a multiplexer 784 that receives an enable loopback signal, a multiplexer 786 (e.g., a 16-to-1 multiplexer), and a transmitter 788 that transmits the pattern over the even DQ/CA/DM links of channel 790 to controller 710.

At 940, controller 710 receives the pattern on the second path that comprises the even DQ/CA/DM links with a half symbol phase offset. Referring to FIG. 7, the second data path further includes a receiver 792, a demultiplexer 794 (e.g., a 1-to-16 demultiplexer), and a bit aligner 796. The receive clock used to clock the demultiplexer 794 and bit aligner 796 is the adjusted receive clock $\text{ADJ}_{RCK}$ output by match circuit 798. When receiving the read-path timing calibration pattern, $\text{ADJ}_{RCK}$ is offset by 0.5 UI. In this way, the controller 710 captures a data word (e.g., a 16-bit data word) on the even DQ/CA/DM links with a phase that is adjusted by one-half of a symbol period relative to the previously calibrated receive phase for the DQ/CA/DM links. After calibration, the 0.5 UI offset is removed from $\text{ADJ}_{RCK}$ such that the receiver reverts to sampling in the middle of the incoming data eye.

At 945, a comparison between the captured data word and the transmitted data pattern sixteen bits is performed. For example, the comparison may be performed using a match circuit 798 (FIG. 7). At 750, controller 710 either increments or decrements the receive phase used by the controller 710 to sample signals received from the even DQ/CA/DM links based on whether the comparison produces a match or no-match result. Match circuit 798 outputs an adjusted receive clock signal $\text{ADJ}_{RCK}$ having an adjusted receive phase. The adjusted receive clock signal $\text{ADJ}_{RCK}$ is provided to the demultiplexer 794. The receive phase adjustment to $\text{ADJ}_{RCK}$ causes it to sample at the center of the incoming data eye. At 955, the controller 710 repeats the receive timing calibration process with the odd and even DQ/CA/DM links swapped, thereby adjusting the receive phase used by the controller 710 to sample signals received from the odd DQ/CA/DM links. During operation 955, match circuit 768 outputs adjusted receive clock signal $\text{ADJ}_{RCK}$ to demultiplexer 764 and bit aligner 766. Repeated performance of process 900 over time results in a series of adjustments to the receive clock signal $\text{ADJ}_{RCK}$, corresponding to the movements of the data eye center, which keeps the memory controller's sampling point for signals received from the DRAM 750 via the DQ/CA/DM links optimized. In some embodiments, the controller 710 includes a state machine controller for each odd/even pair of links, including CA, DQ, and DM. The receive and transmit phases of each link (DQ, CA and DM) is incremented or decremented during its turn depending upon whether the received pattern matches the transmitted pattern.

Output Drive Strength Periodic Calibration

Figure 10:
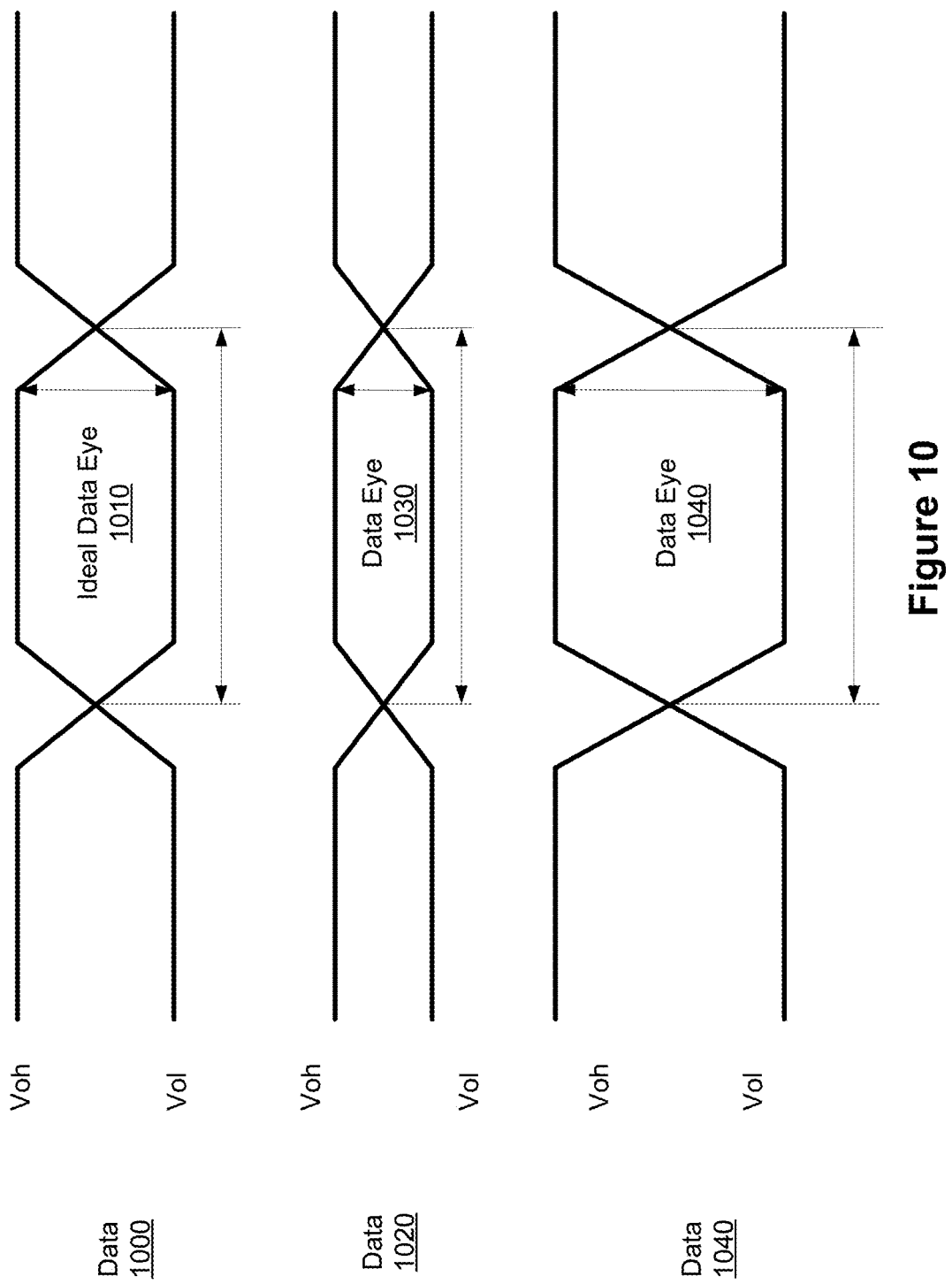
FIG. 10 illustrates data signals with various sizes of data eyes.

In some embodiments, the desired calibration, at 320, is an output drive strength periodic calibration. Output driver calibration in memory systems may improve communication speeds and provide greater reliability over a wide range of operating conditions. FIG. 10 illustrates how variations in process, voltage, and temperature can reduce the size of data eyes. Data eyes reveal characteristics of the quality of the signaling environment such as timing and voltage margins. Robust signaling relies on having wide (good timing margin) and tall (good voltage margin) data eyes. In some embodiments, the periodic output driver calibration is not performed during periodic loopback timing calibration, but is performed in response to an auto-refresh command and thus is performed concurrently with auto-refresh in the memory device(s) coupled to the controller.

A first data signal 1000 has a large data eye 1010 with good timing margin (wide data eye) and good voltage margin (tall data eye). A second data signal 1020 has a smaller than ideal data eye 1030 due to output driver undershooting the signaling levels $V_{oh}$ and $V_{ol}$. A third data signal 1040 has a larger than ideal data eye 1050 due to output driver overshooting the signaling levels $V_{oh}$ and $V_{ol}$.

Output drivers are designed to drive signals between high and low voltage levels, shown as $V_{oh}$ and $V_{ol}$ in FIG. 10. Variations in process, voltage, temperature, and other factors can cause output drivers to overshoot and/or undershoot the desired signaling voltage levels, resulting in reduced margins that impact signal integrity. Reduced timing margins limit the maximum signaling speed because the window of time over which the data is valid (width of the data eye) is smaller. Reduced voltage margins can require larger I/O voltage swings to ensure accurate transmission of data, but such larger swings result in increased I/O power and can increase the sensitivity of the system to cross talk. In order to increase signaling rates and reduce I/O power, output driver overshoot and undershoot must be managed.

Output calibrators are used to calibrate signaling levels in high-speed signaling systems. Through calibration, signal level variations resulting from changes in process, voltage and temperature can be reduced, increasing signaling margins and enabling higher signaling rates.

Figure 11:
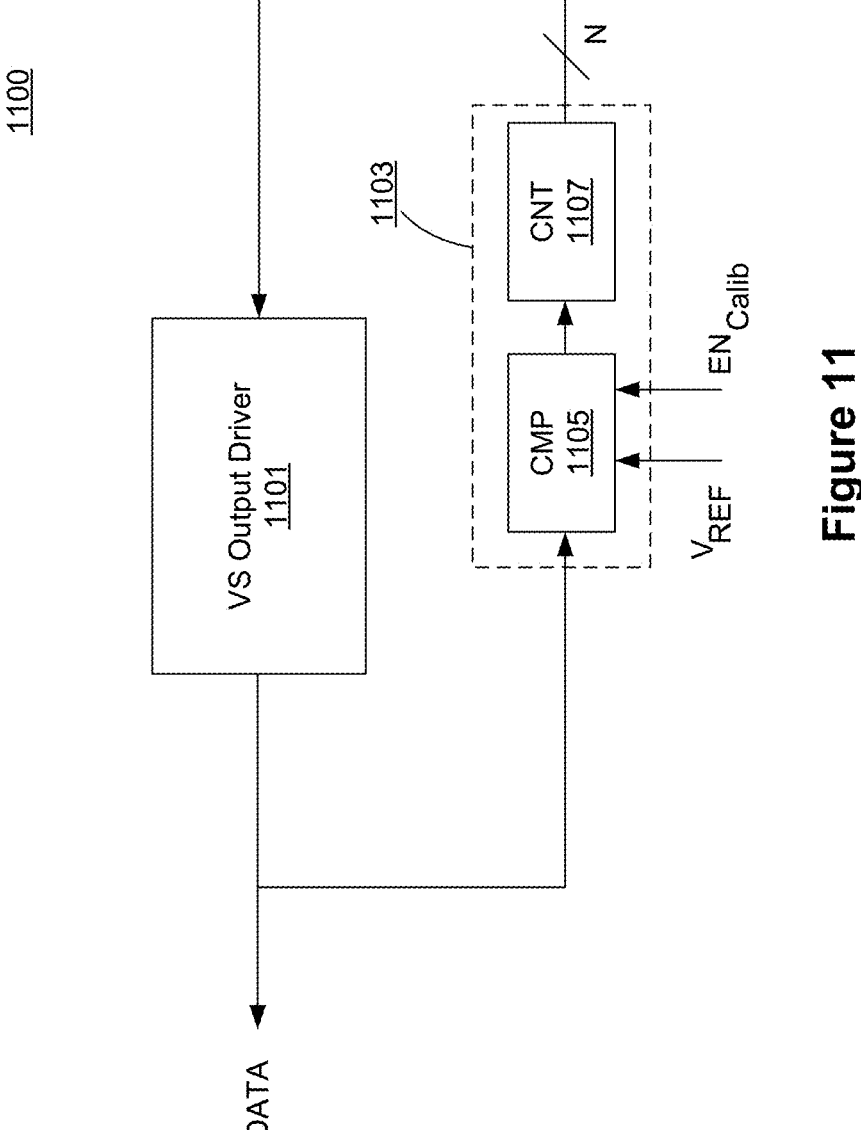
FIG. 11 illustrates an embodiment of an output driver calibration circuit.

FIG. 11 illustrates a signaling system 1100 having a variable-strength output driver 1101 and an output calibrator 1103. The signaling system 1100 may be included in a memory controller 12, 710. The output calibrator 1103 includes a compare circuit 1105 (when enabled by an ENCalib signal) to compare a data signal (DATA) generated by the output driver 1101 with a reference signal $V_{REF}$ based on an enable signal (decoded from auto-refresh command received from the controller) and a counter 1107 that is incremented or decremented according to the comparison result. Reference signal $V_{REF}$ may be generated on-chip or may be supplied externally. The count value maintained within the counter (CNT) is output to the output driver 1101 to control the voltage level of the data signal. Thus, the output calibrator 1103 constitutes a feedback circuit that increases or decreases the data signal level as necessary to reduce the difference between the data signal level and the reference signal level.

A sequence of calibration operations may be performed to adjust the count value, and therefore the data signal level, in the system of FIG. 11. In some embodiments, these calibration operations are performed during self-refresh of the memory devices coupled to the controller. Initially, the count value may set using a binary search or a linear search. For instance, the count value can be initially be set to a midpoint value $2^{N-1}$ to divide the search range for a target signal level (TSL) in half. In one example, the target signal level corresponds to a count value that is above the initial count value so that each initial calibration operation results in a stepwise increment of the count value until, X calibration operations later, a count value of $2^{N-1+X}$ is reached. At this count value, the data signal level exceeds the target signal level, so that the count value is decremented in the next calibration operation, and the calibration operations thereafter produce a stepwise dithering about the target signal level. In some embodiments, the periodic drive strength calibration process separately calibrates the driver for each DQ/CA/DM link. In other embodiments, the periodic drive strength calibration process generates a single calibrated drive strength value for multiple signals as a group, such as for all of the DQ/CA/DM links, or a subset of these links. The single calibrated drive strength value may be shared with each of the links within the group. The output strength calibration process may be repeated periodically so as to adjust the drive strength so as to compensate for any changes in voltage supply, temperature and the like. After the initial calibration, the subsequent calibration operations use the last determined count value (CNT) as the starting point, and continue until the count value dithers back and forth a predetermined number of times, thereby indicating that the output drive calibration process is complete.

On-Die Termination (ODT) Calibration

Referring back to FIG. 3A, the desired calibration, at 320, can be on-die termination (ODT) calibration. In some embodiments, the ODT calibration is not performed during periodic loopback timing calibration, but is performed in response to an auto-refresh command. Thus, the ODT calibration operations are performed during self-refresh of the memory devices coupled to the controller, but do not require the interface of the memory devices to be in a loopback mode.

Variations in the fabrication process as well as fluctuations in voltage and temperature result in variability in the resistive characteristics of the ODT elements. As a result, there is a need for calibration of the ODT elements.

In some embodiments, on-die termination (ODT) systems and methods facilitate high-speed communication between a driver die and a receiver die interconnected via one or more signal transmission lines. An ODT control system in accordance with one embodiment calibrates and maintains the termination resistances and drive currents of the driver die to produce optimal (or nearly optimal) output swing voltages on the signal transmission lines. In some embodiments, an ODT control system calibrates and maintains the termination resistances of the receiver die. In some embodiments, the ODT control system relies upon external voltage and resistance references for termination resistance and drive current calibration.

Figure 12:
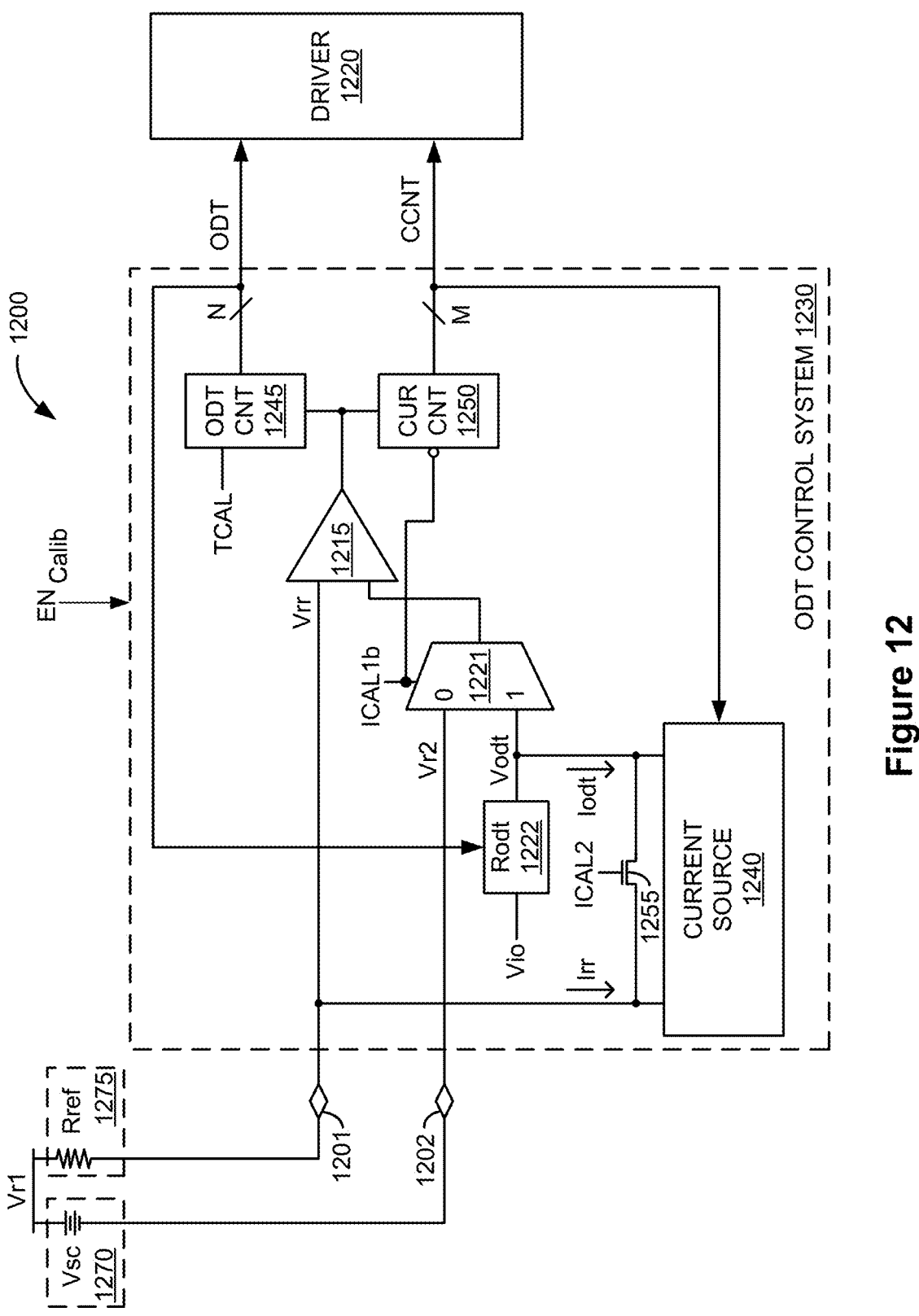
FIG. 12 depicts an embodiment of a termination resistance and drive current calibration system.

FIG. 12 depicts a termination resistance and drive current calibration system 1200 that includes ODT control system 1230. In some embodiments, ODT control system 1230 (when enabled by a respective ENCalib signal) calibrates and maintains the termination resistances and drive currents of the driver die to produce optimal output swing voltages and termination quality on the signal transmission lines.

ODT system control 1230 includes a reference resistor 1275 and a reference voltage source 1270. Reference voltage source 1270 and reference resistor 1275 are external, precision elements connected to ODT system control 1230 via a pair of connection pads 1201 and 1202. Control system 1230 includes a comparator 1215, an analog multiplexer 1221, a reference ODT resistor 1222, and a current source 1240. In some embodiments, the ODT resistor 1222 and the current source 1240 in the ODT control system 1230 are replicas of resistor and current source elements in the driver circuits 1220, which are used to drive signals onto the signal lines of a communication channel. By calibrating the ODT resistor 1222 and the current source 1240, the ODT control system 1230 thereby calibrates the on-die termination characteristics of the driver circuits 1220.

Control system 1230 calibrates the resistance value $R_{odt}$ of ODT resistor 1222 to match the reference resistance $R_{ref}$ of reference resistor 1275. Control system 1230 also matches the current $I_{odt}$ through resistor 1222 with a reference current $I_{rr}$ through reference resistor 1275 to produce a desired voltage drop across ODT resistor 1222. ODT counter 1245 stores a digital value representative of the offset required to calibrate ODT resistor 1222, and a current-control counter 1250 stores a digital value representative of the offset required to calibrate current source 1240. The digital values from counters 1245 and 1250 are then used to calibrate similar or identical termination elements and current sources within driver circuits 1220. The ODT resistor 1222 and the current source 1240 in the ODT control system 1230 are replicas of resistor and current source elements in the driver circuits 1220.

Figure 13:
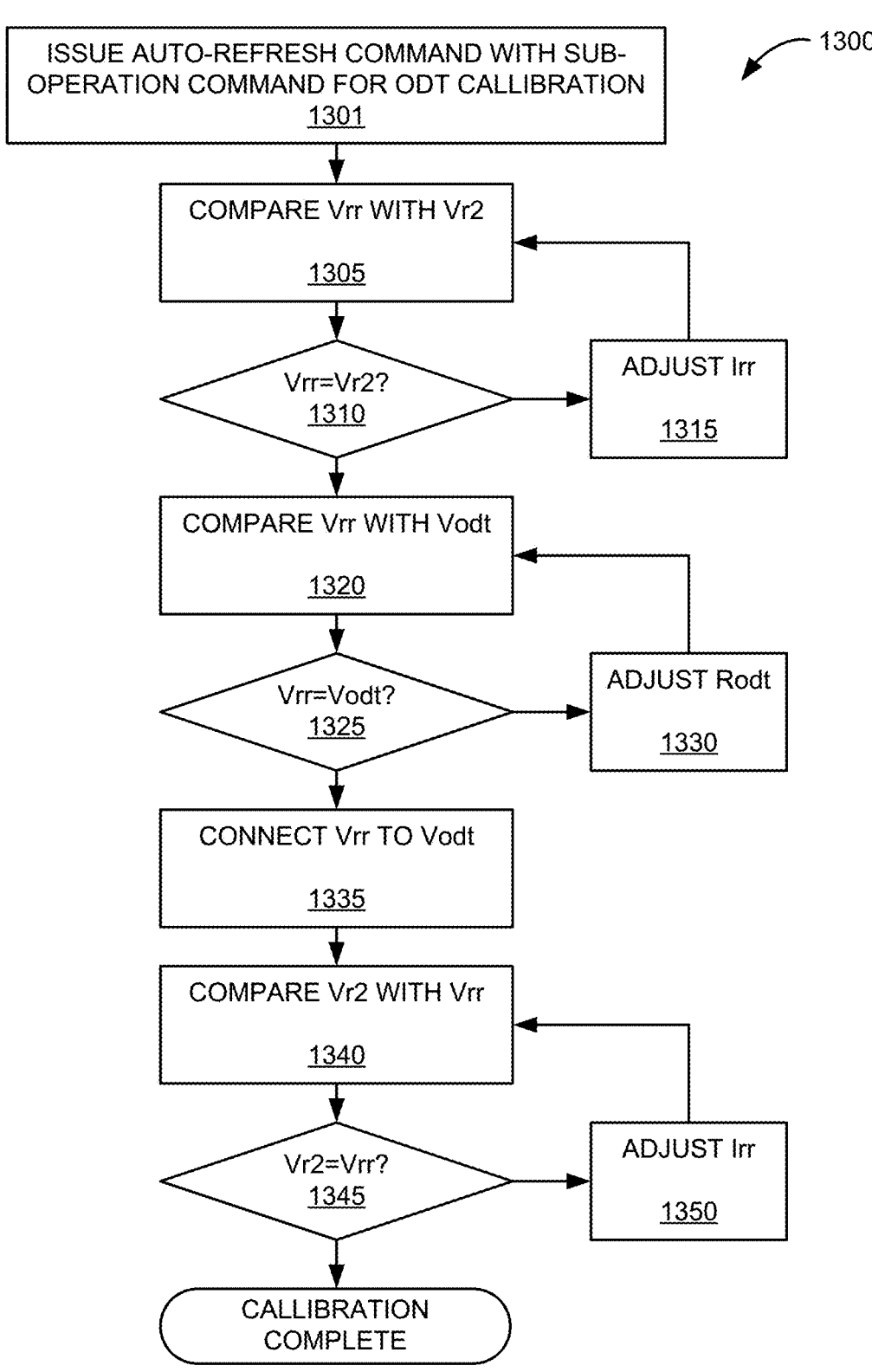
FIG. 13 depicts a flow diagram of a termination resistance and drive current calibration process.

FIG. 13 depicts a process 1300 employed by control system 1230, as shown in FIG. 12, to calibrate reference ODT resistor 1222 and ODT current $I_{odt}$. ODT calibration process 1300 starts when calibration timer 135 times out, and calibration logic 130 issues an auto-refresh command with a sub-operation code or command for ODT calibration, at 1301. For instance, EN=0010 (ODT calibration enabled), TR=1 (transmit calibration) and Odd/Even=0 or 1 (Odd or Even). However, the ODT calibration process may be performed while no signals are being transmitted from the memory controller to the memory device(s), and thus may not require a loopback connection at the control interface of the memory device.

At 1305, current-calibration signal ICAL1*b*, an active-low signal, is asserted. Analog multiplexer 1221 selects second reference voltage Vr2 for comparison with reference voltage $V_{rr}$ from external resistor 1275. The inverse of signal $I_{CAL1b}$, $I_{CAL1}$, enables current-control counter 1250 to increment and decrement in response to output signals from comparator 1215.

Current source 1240 pulls reference current $I_{rr}$ through reference resistor 1275. Per Ohm's law, reference voltage $V_{rr}$ equals reference voltage $V_{r2}$ when the product of reference current $I_{rr}$ and reference resistance $R_{ref}$ equals the swing voltage $V_{sc}$ across voltage reference 1270 (i.e., when $I_{rr}*R_{ref}=V_{sc}$). Comparator 1215 compares voltage $V_{rr}$ with voltage $V_{r2}$ (decision 1310), and adjusts the contents of current-control counter 1250 as necessary to render voltage $V_{rr}$ equivalent (or substantially equal) to voltage $V_{r2}$ (1315). For example, if comparator 1215 determines that $V_{rr}$ is lower than $V_{r2}$, comparator 1215 increments counter 1250 to reduce current Irr, and consequently increase the voltage $V_{rr}$. The comparison and adjustment operations 1305, 1310, and 1315 continue until $V_{rr}$ and $V_{r2}$ are substantially equal (1310). At this point, current counter 1250 stores a count $C_{CNT}$ that offsets the current $I_{rr}$ provided by current source

1240. ODT current $I_{odt}$ is substantially equal to reference current $I_{rr}$, and thus operations 1305, 1310, and 1315 place current $I_{odt}$ at or near the expected operating level.

The granularity of the current-control count $C_{CNT}$ introduces some uncertainty as to the exact reference current $I_{rr}$ and corresponding $I_{odt}$. Employing more register bits and associated bus lines for $C_{CNT}$ reduces this uncertainty at a cost of increased overhead.

The next portion of calibration process 1300 sets the resistance $R_{odt}$ of resistor 1222 substantially equal to the reference resistance $R_{ref}$ of precision resistor 1275 (i.e., $R_{odt}\cong R_{ref}$) by adjusting the count in counter 1245. The first current-calibration signal $I_{CAL1b}$ is de-asserted (held to a logic one), causing multiplexer 1221 to apply voltage $V_{odt}$ from resistor 1222 to the second input terminal of comparator 1215. De-asserting $I_{CALb}$ also disables counter 1250, freezing the current control signal $C_{CNT}$ so as to hold $I_{odt}$ and $I_{rr}$ constant. A termination calibration signal $T_{CAL}$ to counter 1245 is asserted, enabling counter 1245 to increment and decrement in response to output signals from comparator 1215.

At 1320, comparator 1215 compares $V_{rr}$ and $V_{odt}$. ODT counter 1245 increments or decrements in response to the output of comparator 1215, altering the resistance Rodt through ODT resistor 1222. The input voltage $V_{io}$ to termination resistor 1222 is connected to an off-chip voltage reference $V_{r1}$, and is therefore substantially equivalent to voltage $V_{r1}$. Because the currents $I_{rr}$ and $I_{odt}$ are substantially identical, Ohm's law provides that voltage $V_{odt}$ is substantially equal to voltage $V_{rr}$ if resistance $R_{odt}$ of resistor 1222 matches reference resistance $R_{ref}$ of precision resistor 1275. Comparator 1215 thus adjusts the contents of counter 1245 (1320) until decision 1325 determines that voltages $V_{rr}$ and $V_{odt}$ are substantially equal (1325). The granularity of ODT-control count ODT introduces some uncertainty as to the exact reference resistance $R_{odt}$. This uncertainty can be improved by employing more register bits within counter 1245, but this improvement comes at a cost of increased overhead.

Input/output voltage $V_{io}$, being distributed on chip, may vary by some small amount from external reference voltage $V_{r1}$. The resulting uncertainty combines with other uncertainties, such as those resulting from the measurement granularities of counters 1245 and 1250, to produce still greater uncertainty. A second current-calibration sequence recalibrates ODT current $I_{odt}$ using the calibrated ODT resistor 1222 and input voltage $V_{io}$ to reduce this uncertainty.

At 1335, signal $T_{CAL}$ is de-asserted and both current-control signals $I_{CAL1b}$ and $I_{CAL2}$ are asserted. Counter 1245, and thus resistance $R_{odt}$, is thus held constant as comparator 1215 once again compares $V_{r1}$ with $V_{rr}$ (1340). Counter 1250 increments or decrements in response to output signals from comparator 1215 (1350). Incrementing or decrementing the counter 1250 adjusts the current $I_{rr}$ (1350), and also adjusts $V_{rr}$. Comparator 1215 compares $V_{r2}$ with the adjusted $V_{rr}$ (1340), and the calibration process 1300 is complete when voltages $V_{r2}$ and $V_{rr}$ are substantially equal (1345). The resulting offsets held in counters 1245 and 1250 are distributed on buses ODT and $C_{CNT}$ to drivers and receivers to establish appropriate ODT resistances and drive currents.

Input Offset Voltage/Current Trim Periodic Calibration

Referring back to FIG. 3A, in some embodiments, the desired calibration, at 320, is a calibration of the command interface of the memory device that includes adjusting an input offset voltage value stored in the memory device. The input offset voltage value is used by a data sampler in a receive circuit of the memory device. The input offset voltage calibration operations are performed during self-refresh of the memory devices coupled to the controller, but do not require the interface of the memory devices to be in a loopback mode.

The process of determining and storing the memory device voltage offset value(s) may be performed periodically or upon detection of some threshold number of bit errors. One or more voltage offset values are used to adjust memory device read/write voltages in relation to Vref so that Vref is maintained as a reference and voltage effects are compensated at a local level rather than forcing a system level compensation scheme.

The input offset voltage (or current) calibration process starts when calibration timer 135 times out, and calibration logic 130 issues an auto-refresh command with a sub-operation code or command for input offset voltage calibration. In one embodiment, the sub-operation code of the ARF command for input offset voltage calibration is EN=0001 (input offset calibration enabled, loopback not enabled), TR=1 (transmit calibration) and Odd/Even=don't care (Odd or Even).

Figure 14:
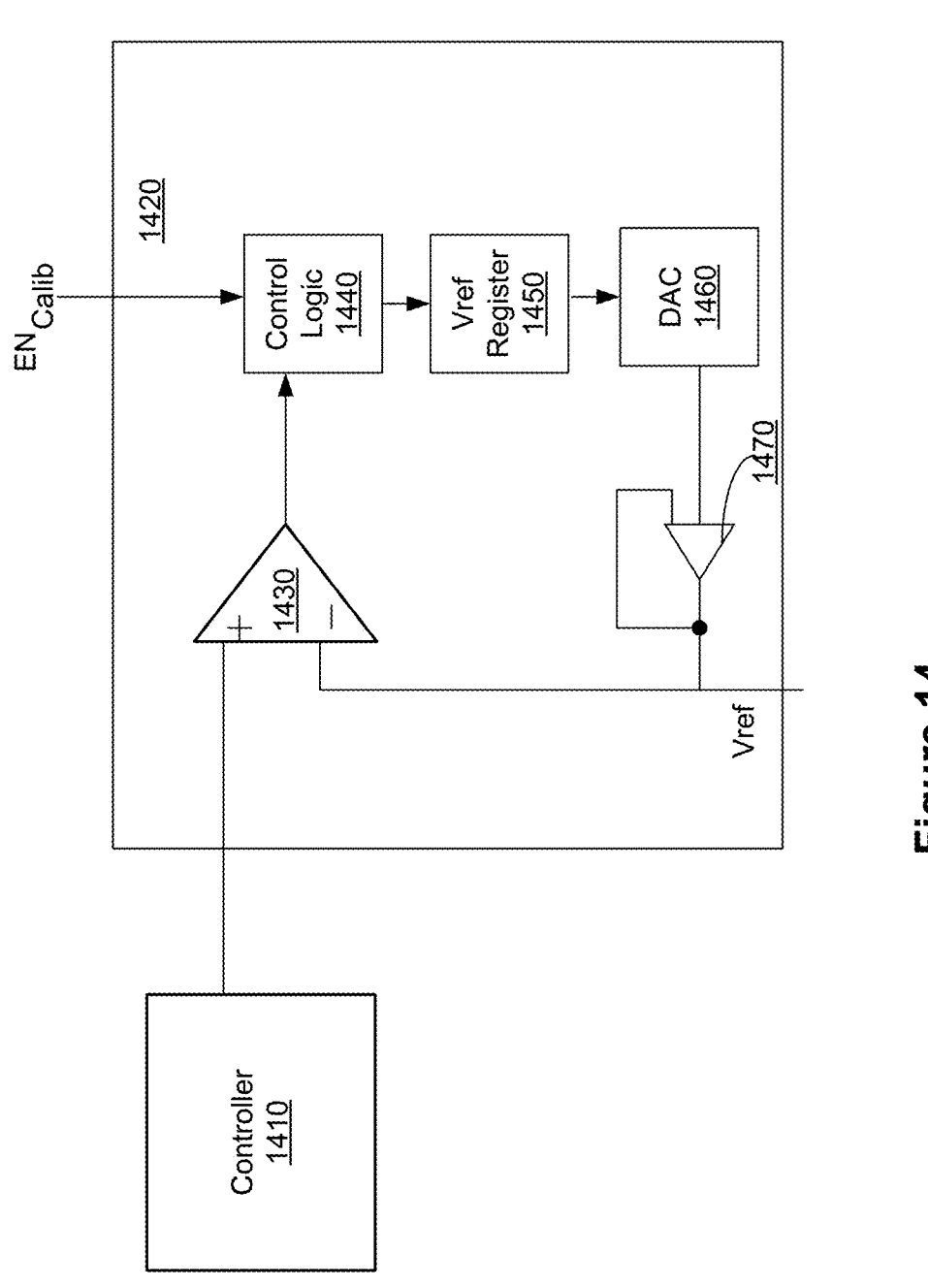
FIG. 14 illustrates a circuit for input offset voltage periodic calibration.

In one embodiment, to determine the voltage offset values, a scanning window is used to calibrate slave voltages (e.g., voltages, or input offset voltages, in a memory device). The circuit 1400 shown in FIG. 14 assumes a voltage calibration directed to the input (or write) voltage swing for data transmitted from controller 1410 to the memory device 1420. The voltage level of data being written from controller 1410 to a receiver in a memory device 1420 is compared by comparator 1430 with a reference voltage "Vref" signal. The comparison result is fed back through control logic 1440, Vref register 1450, and a DAC 1460, to an offset-port of a stabilizing amplifier 1470. As shown in FIG. 14, comparator 1430, control logic 1440, Vref register 1450, DAC 1460 and stabilizing amplifier 1470 are all located within the memory device 1420. High and low pass/fail transition points are identified. Vref on the memory device 1420 is set by control logic 1440 (when enabled by a respective ENcalib signal), and stored in Vref register 1450 in accordance with a final adjustment offset value located halfway (or approximately halfway) between the offset values corresponding to the high and low pass/fail transition points. Vref is provided to the memory device 1420 by the output of the stabilizing amplifier 1470.

Equalization Periodic Calibration

Referring back to FIG. 3A, in some embodiments, the desired calibration, at 320, is a calibration of the command interface of the memory device that includes performing equalization calibration.

Figure 15:
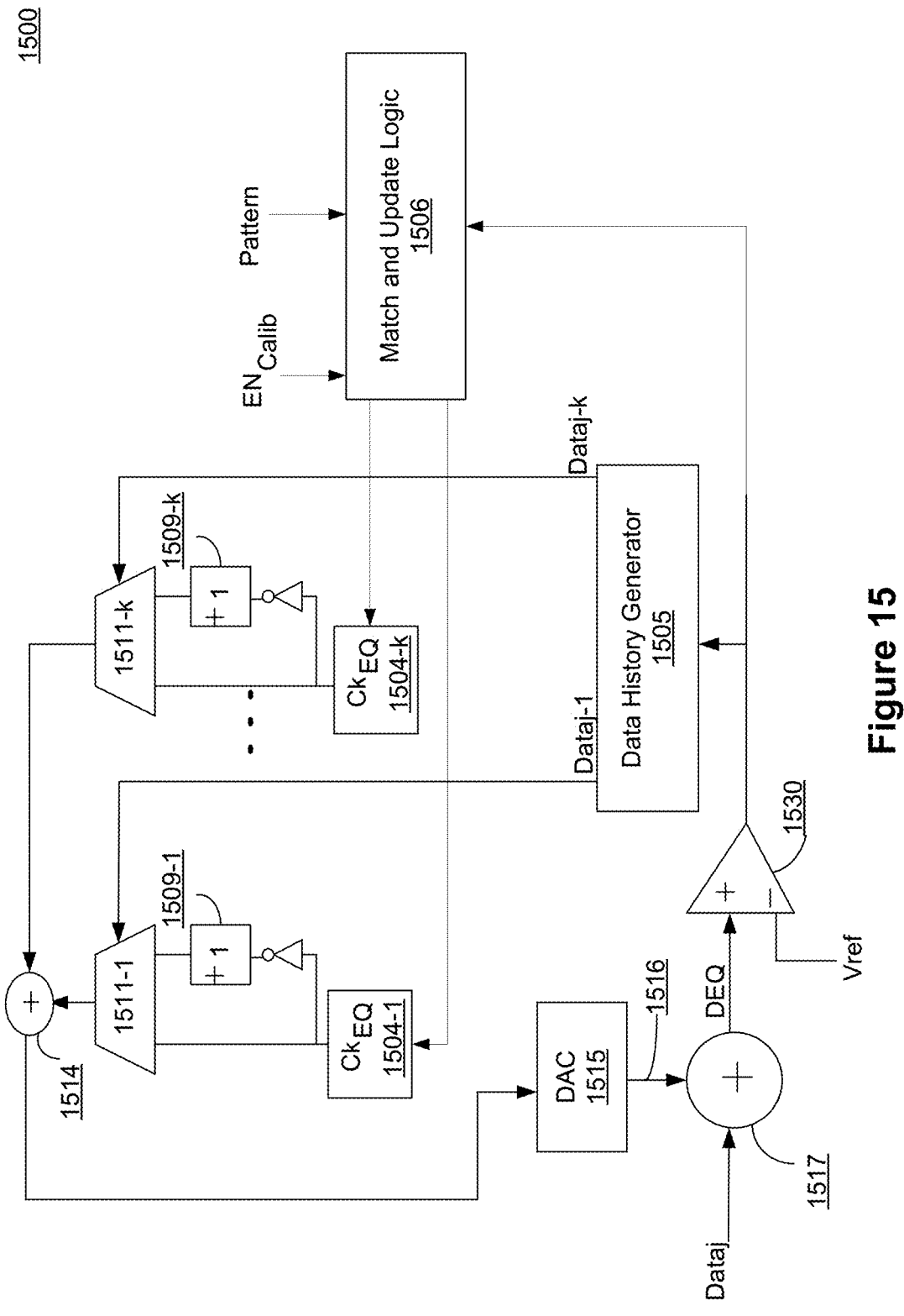
FIG. 15 illustrates an output driver that includes temporal equalization circuitry.

FIG. 15 illustrates a receiver 1500 with equalization circuitry according to one embodiment. Receiver 1500 can be located within a memory device and enabled with a respective ENcalib signal, or can be located within a memory controller. In one embodiment, the sub-operation code of the ARF command for input offset voltage calibration is EN=0011 (equalization calibration enabled, loopback not enabled), TR=1 (transmit calibration) and Odd/Even=don't care (Odd or Even). Incoming data, $Data_j$, is summed with an equalization offset 1516 by analog adder 1517, generating an equalized data value DEQ, for comparison with $V_{ref}$ by a comparator 1530. The equalization offset 1516 is generated by adding and subtracting equalization coefficients $C1_{EQ}$ to $CK_{EQ}$ according to the state of previously received data values, $Data_{j-1}$, to $Data_{j-k}$, respectively.

A data history generator 1505, which may be implemented as a shift register, receives the output of the comparator 1530 and generates the data history values, $Data_{j-1}$ to $Data_{j-k}$. The data history values are used to select, via multiplexers 1511-1 to 1511-k, between positive and negative versions of respective equalization coefficients $C1_{EQ}$ to $CK_{EQ}$ stored in equalization registers 1504-1 to 1504-k. Equalization coefficients $C1_{EQ}$ to $CK_{EQ}$ may be positive or negative values. A digital adding circuit 1514 receives the output from each of the multiplexers 1511-1 to 1511-k and generates a sum of coefficients, which it provides to a digital-to-analog converter (DAC) 1515. The DAC 1515 generates an analog equalization offset value 1516 which is summed by analog adder 1517 with the incoming data value, $Data_j$.

Once the equalization coefficients are determined at initialization time, a simple pattern (or set of patterns, sometimes called test patterns) is run periodically to generate an increment/decrement decision on a respective coefficient to adjust the equalization so as to compensate for changing system conditions. This periodic calibration can be performed while the memory device is performing a self-refresh operation. Match and update logic 1506 updates respective equalization coefficients $C1_{EQ}$ to $CK_{EQ}$ stored in equalization registers 1504-1 to 1504-k, when enabled by the ENCalib signal for enabling equalization calibration. From the above discussion, it can be seen that the command interface of the memory device need not be in loopback mode while equalization calibration in the memory device is performed.

Auto-Refresh Command

In some embodiments, a DRAM device, such as DRAM 18, receives an auto-refresh command from an external controller, such as controller 12, such that the auto-refresh command specifies a bank order for performing the refresh operation. Responsive to the auto-refresh command, DRAM 18 sequentially refreshes a respective row in the plurality of memory banks, in the specified bank order. In some embodiments, as illustrated in FIG. 16, the auto-refresh command 1600 includes a bank order field specifying the bank order in which the bank refresh operations are to be performed.

Auto-refresh command 1600 illustrated in FIG. 16 includes bits that are used to specify a bank order. Bits B00 and B01 together identify the first bank to be refreshed, bits B02 and B03 identify the second bank to be refreshed, and so on. In other embodiments, such as, in an embodiment having a memory device with more than four banks, a different number of bits is used to specify the bank order. In some embodiments, it may only be necessary to specify the first and last banks to refresh, or the first two banks and the last two banks to refresh, or the first several banks to refresh and the last several banks to refresh, with the middle banks in an arbitrary order.

Figure 17:
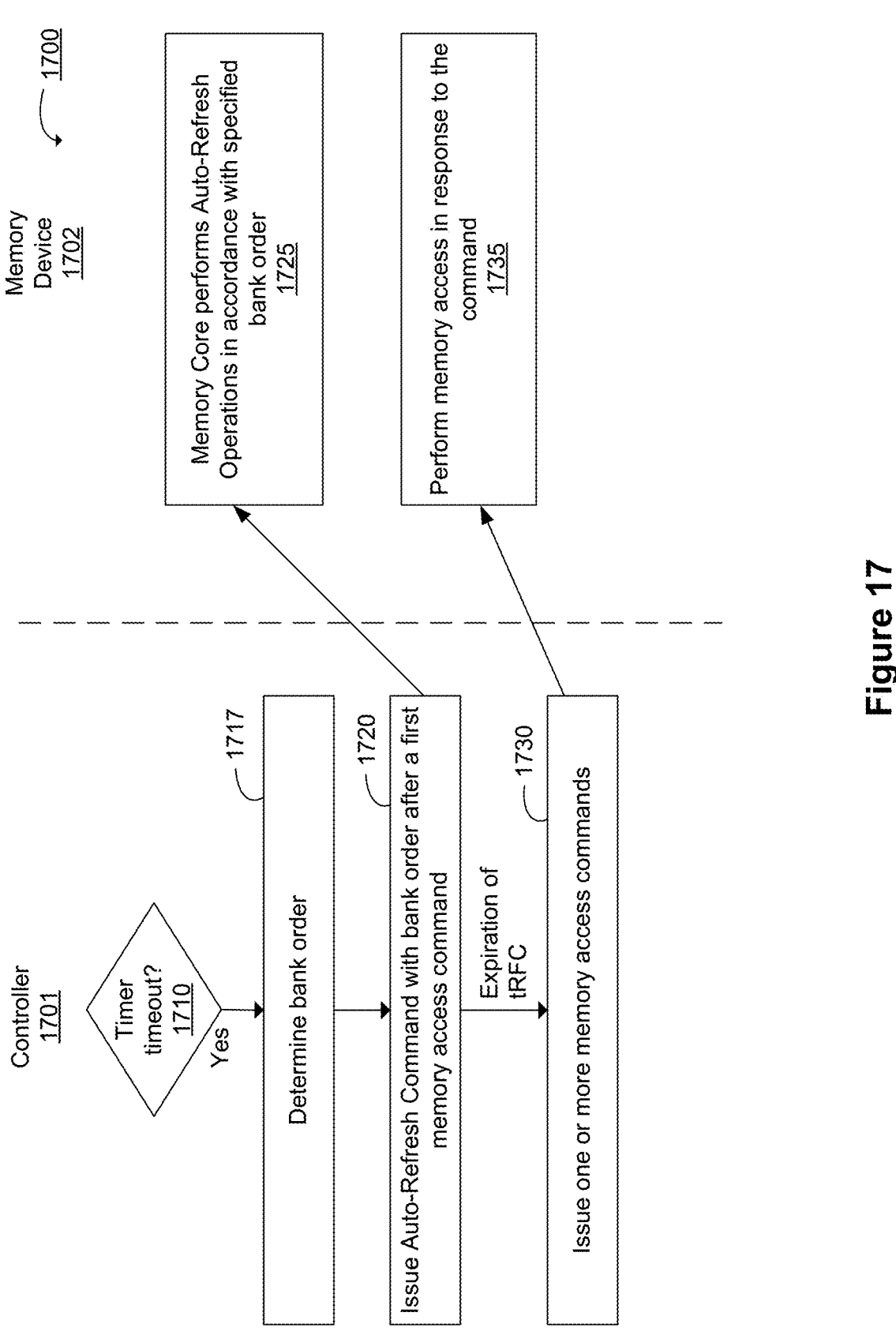
FIG. 17 depicts a flow diagram of an auto-refresh operation.

FIG. 17 is a flow diagram of memory controller logic 1700 according to an embodiment that supports issuance of an auto-refresh command with bank order. Initially, at 1710, a timer (e.g., timer 145) within the memory controller 1701 times out to indicate that it is time to perform an auto-refresh operation.

At 1717, a bank order is determined, for instance, by the auto-refresh logic 140 of the memory controller. In some embodiments, the bank order may be based on the availability of a given bank. For instance, a given bank may not considered to be available if a bank's sense amplifier arrays are in use by another bank, as may happen with bank-doubling. Similarly, a bank may not considered to be available if a bank's sense amplifier arrays are in use due to a recently executed memory access operation. In some embodiments, the bank order may be based on which bank was precharged last among the banks.

In some embodiments, the bank order is selected by the memory controller (or by the auto-refresh logic 140 of the memory controller) to satisfy two goals: to avoid or minimize the need for any delay before refreshing the first specified bank of the memory device, and to avoid or minimize the need for any delay after refreshing the last specified bank of the memory device and before a next memory operation can be performed. Thus, in these embodiments the first bank in the determined bank order is one that is available for immediate refresh (taking into account the state of the memory banks immediately prior to transmitting the auto-refresh command), and the last bank in the determined bank order is a bank that will not be used by a first memory operation that immediately follows the auto-refresh operation.

At 1720, a single auto-refresh command specifying the determined bank order is generated to auto-refresh all memory banks of the memory device. The auto-refresh command may be generated, for instance, by the auto-refresh logic 140 (FIG. 4) of the memory controller. An embodiment of such an auto-refresh command is shown in FIG. 16. In other embodiments, other bits of the auto-refresh command (other than those shown in FIG. 16 as B00 through B07) may be used to specify the bank order. In yet other embodiments, the bank order may be specified by a value that identifies one of N (e.g., 2, 4 or 8) predefined bank orders. This value, which functions like an index into a table or predefined set, is decoded by the memory device to determine bank order for the auto-refresh operation. In yet additional embodiments, the bank order may be specified by a value that identifies only a first bank to be refreshed. In these embodiments, the banks of the memory device are refreshed in sequential order, starting with the specified first bank. In some embodiments, it may only be necessary to specify the first one, two or several banks to refresh and the last one, two or several banks to refresh, with the middle banks in an arbitrary order. This is because the stream of read or write transactions before and after the refresh burst use banks in a certain sequence, and the bank order at the beginning and the end of the refresh burst can be adjusted to an ordering which dovetails into the read or write transaction streams.

The auto-refresh command specifying bank order is transmitted on a communication channel, such as channel 16, to DRAM 1702. In some embodiments, the single auto-refresh command specifying bank order to initiate refresh operations on respective rows of memory banks of the memory device is issued to the memory device between any two memory access commands, such as read, write, interleaved read, and interleaved write commands.

At 1725, DRAM 1702, responsive to the auto-refresh command, sequentially refreshes a respective row in the plurality of memory banks, in the specified bank order. An embodiment of auto-refresh circuitry that performs the auto-refresh operation is discussed further in reference to FIG. 18.

At 1730, after expiration of a predefined time period (e.g., tRFC, FIG. 5) associated with completion of an auto-refresh operation, controller 1701 optionally issues one or more memory access commands, such as read, write, interleaved read, interleaved write, to the DRAM 1702 to access the rows of memory cells therein. At 1735, after the refresh operations are performed, responsive to the memory access commands, DRAM 1702 performs the memory access operation(s) specified by the one or more memory access commands.

Auto-Refresh Circuitry

Figure 18:
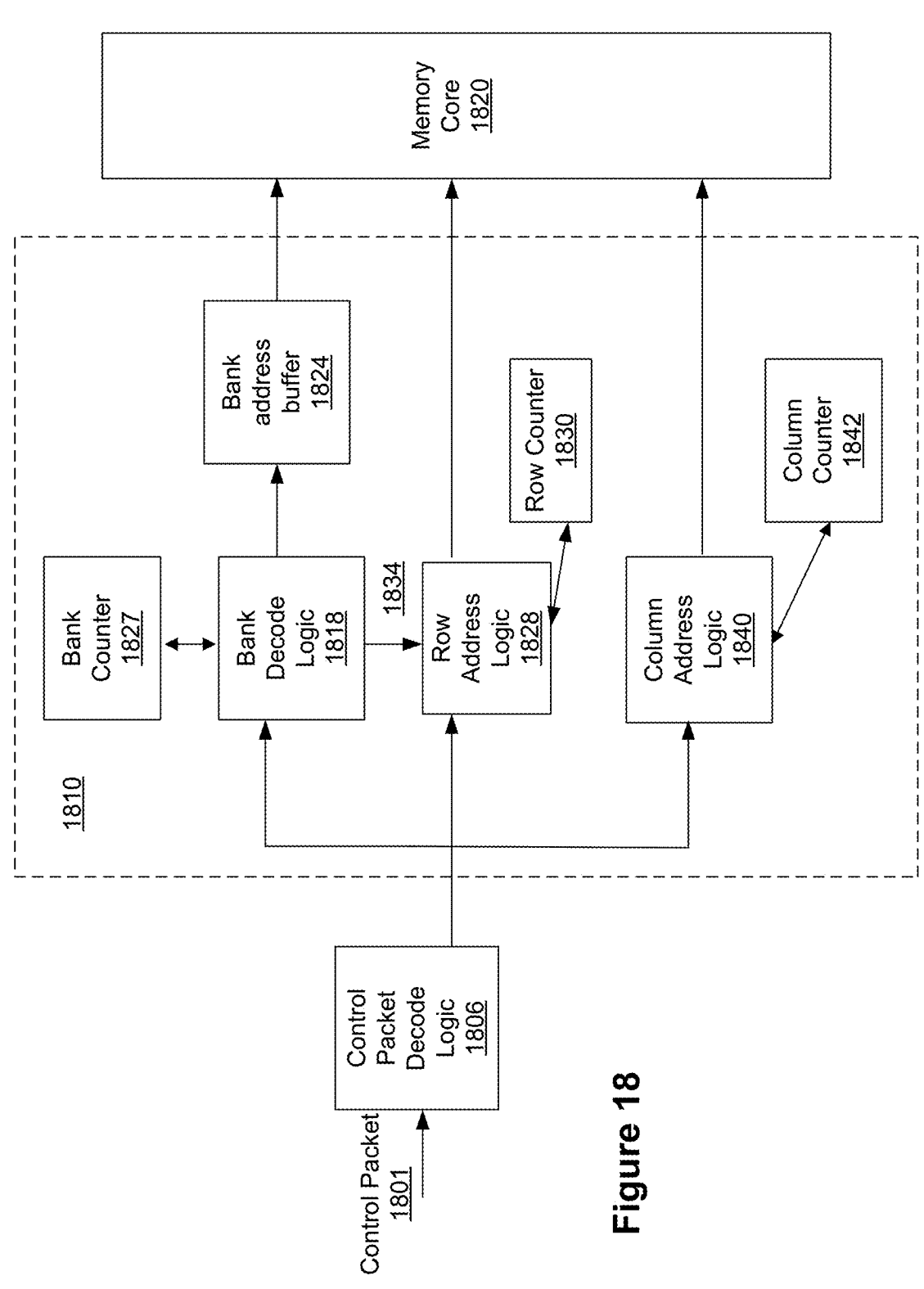
FIG. 18 illustrates a DRAM with auto-refresh circuitry.

FIG. 18 illustrates an embodiment of a DRAM device 1800 that includes auto-refresh circuitry 1810 according to some embodiments.

Control packet decode logic 1806 receives a control packet 1801 from a controller, such as controller 1701. For purposes of this discussion, it is assumed that a respective received control packet 1801 includes an auto-refresh command that specifies a bank order, such as auto-refresh command 1600. The control packet 1801 is decoded by the control packet decode logic 1806 to produce internal control signals for auto-refresh circuit 1810. It is also noted that during the first time interval (also called the auto-refresh interval or the calibration interval), after receipt of the auto-refresh command (ARF), the control packet decode logic 1806 ignores (or, equivalently, does not accept) any control packets sent by the memory controller until termination of the first time interval.

Auto-refresh circuitry 1810 includes bank decode logic 1818, which generates a sequence of bank addresses in accordance with the bank order specified in the auto-refresh command in the control packet. Auto-refresh circuitry 1810 may further include a bank address buffer 1824, which is used to store the address of a bank within the DRAM 18 that is to be refreshed during an auto-refresh operation, in accordance with a bank order specified by the auto-refresh command.

Bank decode logic 1818 places addresses in the bank address buffer 1824 in an order in accordance with the bank order specified in the auto-refresh command, such as command 1600. Also, in response to the auto-refresh command, row address logic 1828 determines the row address for next row to be refreshed. For a particular row, banks are refreshed in the order in accordance with the bank order specified in the auto-refresh command, such as command 1600.

Bank decode logic 1818 compares the bank address in the bank address buffer 1824 to the address of the last bank that is to refreshed in accordance with the bank order specified by the auto-refresh command. For instance, bank decode logic 1818 may compare the bank address in the bank address buffer 1824 with the bank address found in fields B06 and B07 of auto-refresh command 1600 illustrated in FIG. 16. When the bank address in the bank address buffer 1824 is equal to the address of the last bank that is to refreshed in accordance with the bank order specified by the auto-refresh command, indicating that all banks for a particular row have been refreshed, the bank decode logic 1818 sends an increment signal on a line 1834 to row counter 1830 to increment the row count for the next sequencing of banks. After the maximum row has been refreshed in all the banks of the memory device, the row counter is reset to zero.

In some embodiments (including the embodiment shown in FIG. 18), control packet 1801 that contains the auto-refresh command also includes a row address. The row address from the control packet is decoded by row address logic 1828 to determine which row to refresh first. In other embodiments, the row address is not included in the control packet 1801, thus, only the internal row counter 1830 is utilized for auto-refresh.

The auto-refresh circuitry 1800 optionally includes column address logic 1840 and column address counter 1842 to determine which column(s) to refresh. However, in some embodiments, when a row is refreshed, all columns of that row are refreshed.

Auto-Refresh and Concurrent Calibration

Figure 19:
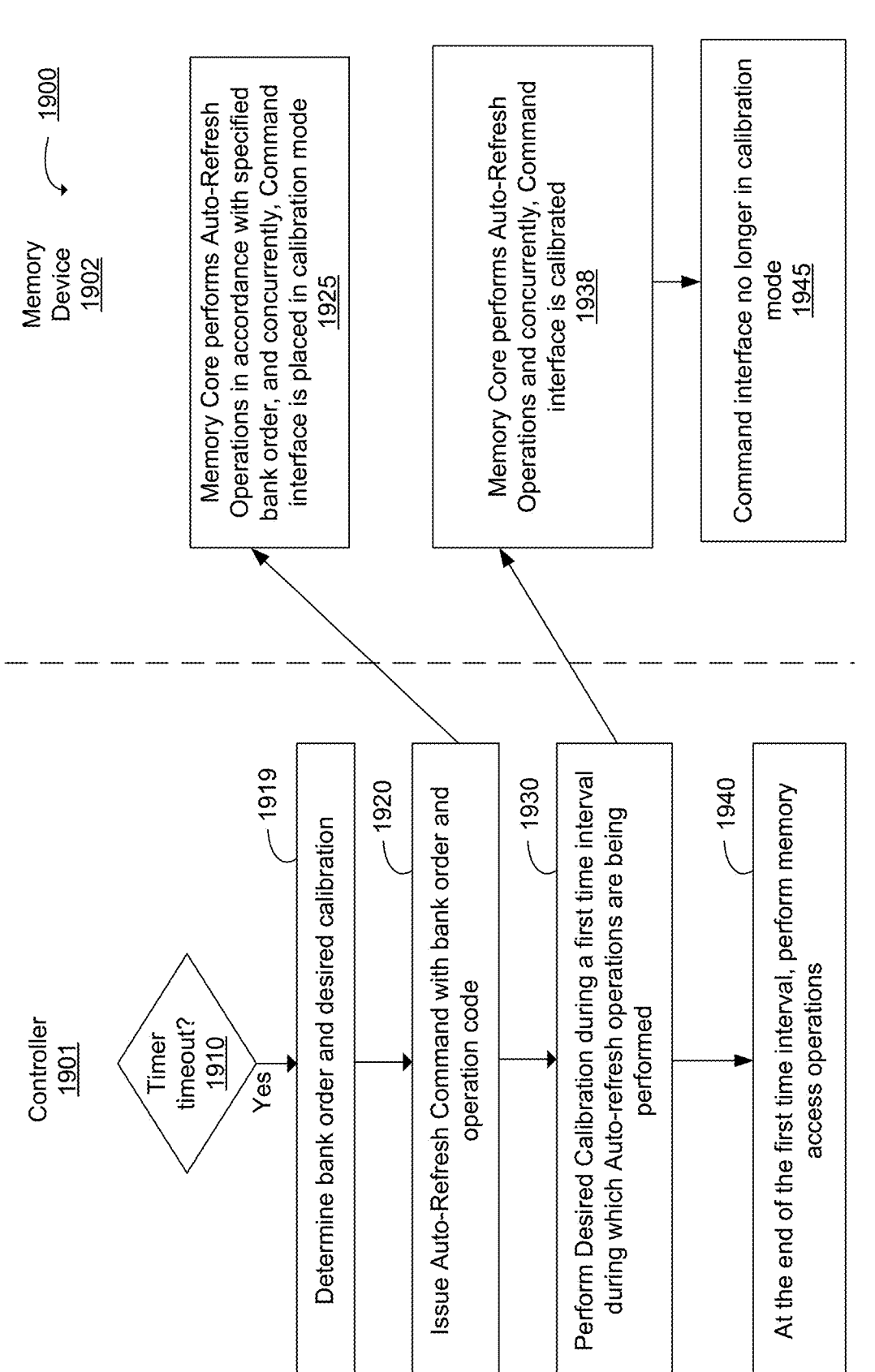
FIG. 19 depicts a flow diagram of an auto-refresh operation.

FIG. 19 is a flow diagram of memory controller logic 1900 according to an embodiment that supports issuance of an auto-refresh command with bank order and a calibration operation code. Initially, at 1910, a timer (e.g., timer 145) within the memory controller 1901 times out to indicate that it is time to perform an auto-refresh operation.

At 1919, a bank order is determined, for instance, by the auto-refresh logic 140. Several ways of determining the bank order are discussed above. Additionally, at 1919, a desired calibration of the DRAM command interface, such as command interface 25, is determined, for instance by calibration logic 130.

Figure 20:
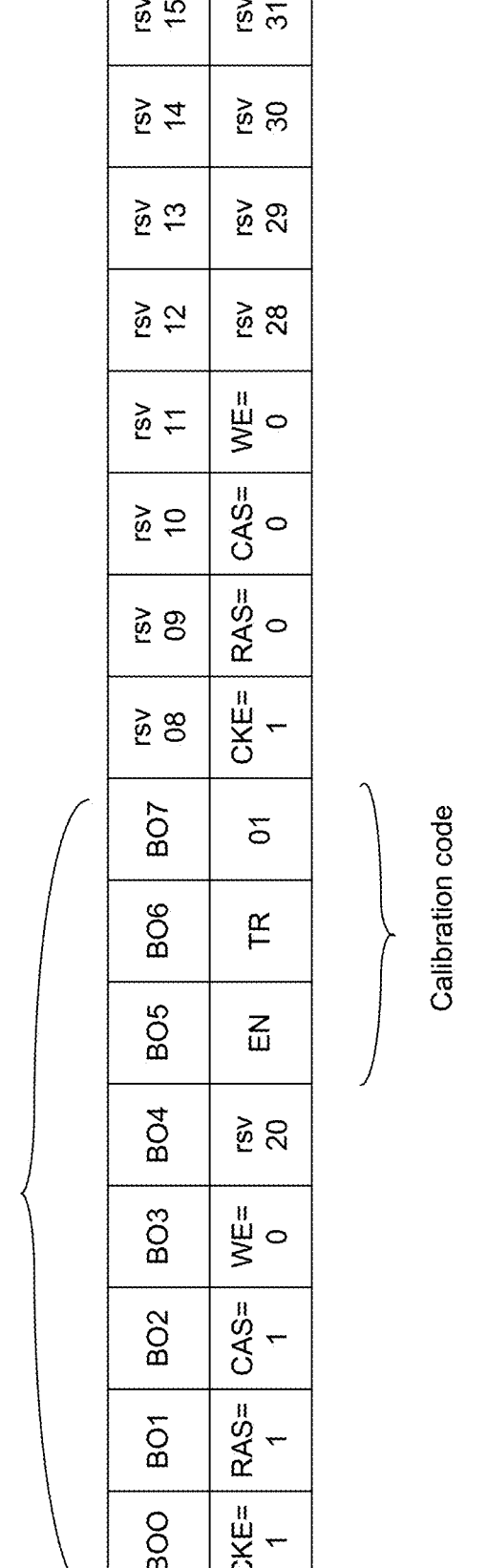
FIG. 20 illustrates an auto-refresh command with bank order information and operation code.

At 1920, a single auto-refresh command specifying bank order is generated to auto-refresh all memory banks, for instance, by the auto-refresh logic 140. In some embodiments, the auto-refresh command includes an operation code identifying the desired calibration. An embodiment of such an auto-refresh command 2000 is shown in FIG. 20. The auto-refresh command 2000 includes bank order fields, and also an operation code specifying a calibration mode or operation. In the example shown in FIG. 20, the specified calibration operation is a transmit timing calibration operation.

The auto-refresh command specifying bank order is transmitted on a communication channel, such as channel 16, to the DRAM device 1902. In some embodiments, the single auto-refresh command specifying bank order to initiate refresh operations on respective rows of memory banks of the memory device is issued to the memory device between any two memory access commands, such as read, write, interleaved read, and interleaved write commands.

At 1925, DRAM 1902, responsive to the auto-refresh command, initiates refresh operations of the plurality of memory banks, in the specified bank order. An embodiment of auto-refresh circuitry that performs the auto-refresh operation is discussed above with reference to FIG. 18. Concurrent to the refresh operation, the command interface of the DRAM is placed in loopback mode. In some embodiments, the command interface of the DRAM is placed in loopback mode during auto-refresh operations only if A) the auto-refresh command includes a sub-command specifying a calibration operation for which the command interface is placed in loopback mode, or B) the auto-refresh command includes a sub-command that specifies the loopback mode directly. Otherwise, in these embodiments the command interface of the DRAM is not placed in loopback mode during auto-refresh operation.

Timing calibration process 1900 includes concurrently to the refresh operations, performing a desired calibration of the command interface, such as command interface 25, of the DRAM 18 during a first time interval, at 1930. The first time interval is the interval for which the auto-refresh operations are performed. While the DRAM 18 core (comprised of the memory banks 34) is busy performing the auto-refresh operations, the command interface 25 of the DRAM 18 is concurrently calibrated, at 1938.

Upon expiration of the first time interval, the command interface of the DRAM 1902 is placed back into a normal operation mode from a calibration mode, at 1945. In addition, at the end of the first time interval, the controller resumes issuing normal memory access requests, such as read, write, interleaved read, and interleaved write commands, at 1940.

In some embodiments, as discussed, the bank order is selected by the memory controller (or by the auto-refresh logic 140 of the memory controller) to satisfy at least one of two goals: to avoid or minimize the need for any delay before refreshing the first specified bank of the memory device, and to avoid or minimize the need for any delay after refreshing the last specified bank of the memory device and before a next memory operation can be performed. Thus, in these embodiments the first bank in the determined bank order can be one that is available for immediate refresh (taking into account the state of the memory banks immediately prior to transmitting the auto-refresh command), and the last bank in the determined bank order is a bank that will not be used by a first memory operation that immediately follows the auto-refresh operation. In some embodiments, channel command sequencer 150 of the memory controller includes a state machine to keep track of the state of the memory banks immediately prior to transmitting the auto-refresh command, and this information is used by the auto-refresh logic 140 of the memory controller to determine the bank order.

Figure 21:
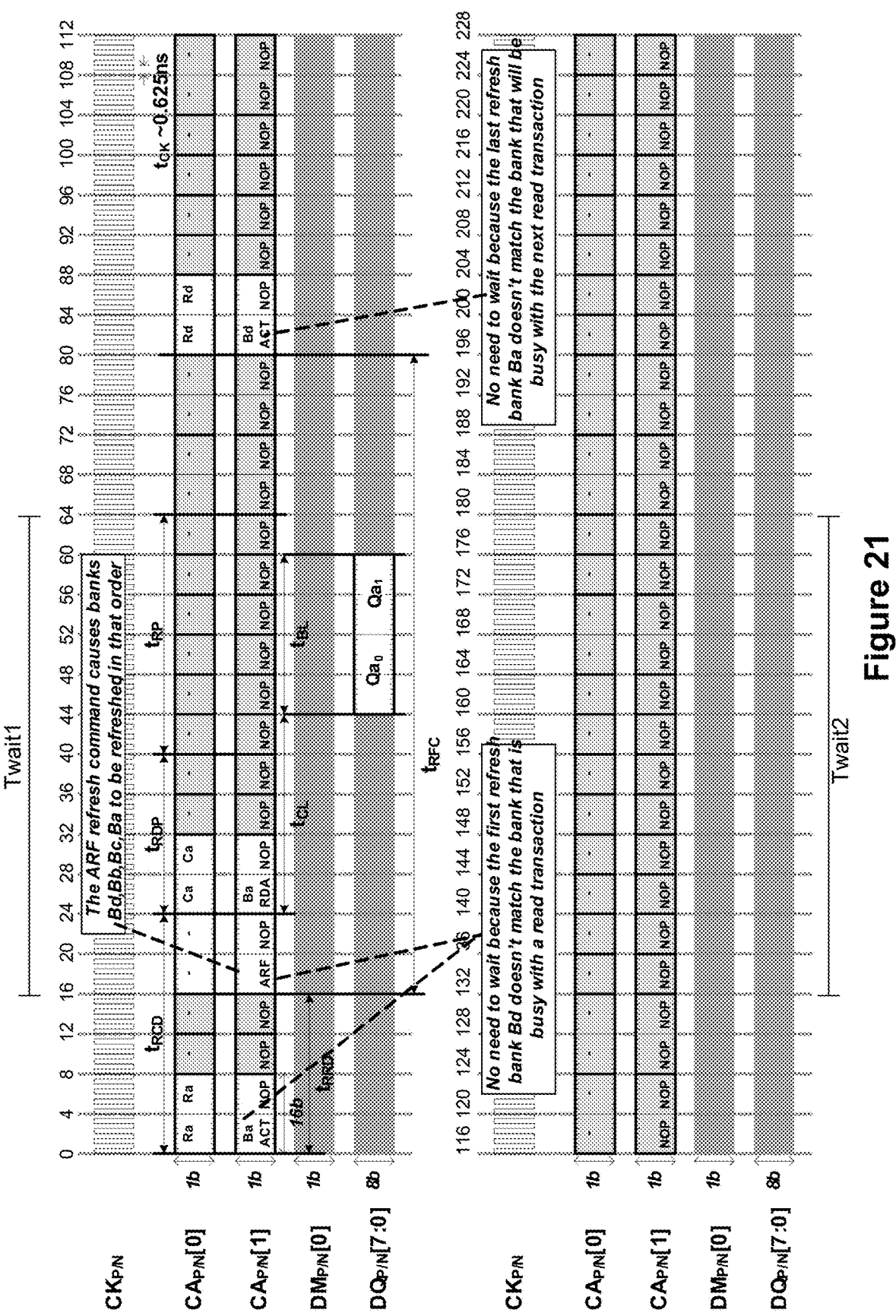
FIG. 21 illustrates an example timing diagram of an interleaved read-refresh-read operation.

Refresh operations may be dovetailed with both prior and subsequent operations, which can be refresh operations, memory access operations, or other operations. FIG. 21 illustrates an example timing diagram of an interleaved read-refresh-read operation. An auto-refresh command causes banks Ba, Bb, Bc, Bd to be refreshed in that order. If the first bank to be refreshed Ba matches a bank that is busy with a read transaction, a delay of $t_{WAIT1}$ occurs. By interleaving, the first bank to be refreshed becomes Bd. Thus, no delay of $t_{WAIT1}$ occurs since bank Ba is the one that is busy, and bank Bd is not the bank that is busy with a read transaction. Further, if the last bank to be refreshed Bd matches a bank that is busy with the next read transaction, a delay of $t_{WAIT2}$ occurs. By interleaving, there is no need to wait because the last refresh bank Ba does not match the bank that will be busy with the next read transaction.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the invention and its practical applications, to thereby enable others skilled in the art to best utilize the invention and various embodiments with various modifications as are suited to the particular use contemplated.

What is claimed is:

1. A memory controller to control a dynamic random access memory (DRAM) device that includes a data interface to receive data, and DRAM memory cells, the memory controller comprising:

a command interface to transmit an operation code to the DRAM device to enable a calibration operation of the data interface of the DRAM device to occur in parallel with a refresh operation of the DRAM memory cells; and a data receiver to receive a data pattern, in connection with the calibration operation, from the data interface of the DRAM device.

2. The memory controller of claim 1, wherein the command interface is to transmit a refresh command that initiates the refresh operation, and the operation code is transmitted as part of the refresh command.

3. The memory controller of claim 2, wherein the refresh command includes a plurality of bits that specify that the DRAM device perform an internal refresh operation to refresh data stored in at least one bank of a plurality of memory banks of the DRAM memory cells.

4. The memory controller of claim 2, wherein the refresh command specifies an auto-refresh operation.

5. The memory controller of claim 2, further comprising a timer to detect a condition to trigger the command interface to generate the refresh command.

6. The memory controller of claim 1, wherein the operation code to enable the calibration operation in parallel with the refresh operation includes a bit to specify a calibration of odd or even links of the data interface of the DRAM device.

7. The memory controller of claim 1, wherein the operation code to enable the calibration operation includes a bit to specify a transmit or receive calibration of the data interface of the DRAM device.

8. The memory controller of claim 1, wherein the operation code to enable the calibration operation includes one or more bits to specify an equalization calibration of the data interface of the DRAM device.

9. A method of operation of a memory controller to control a dynamic random access memory (DRAM) device that includes a data interface to receive data, and DRAM memory cells, the method comprising:

transmitting, via a command interface of the memory controller, an operation code to the DRAM device to enable a calibration operation of the data interface of the DRAM device to occur in parallel with a refresh operation of the DRAM memory cells; and receiving a data pattern, via a data receiver of the memory controller, in connection with the calibration operation, from the data interface of the DRAM device.

10. The method of claim 9, including transmitting to the DRAM device a refresh command that initiates the refresh operation, wherein the operation code is transmitted as part of the refresh command.

11. The method of claim 10, wherein the refresh command includes a plurality of bits that specify that the DRAM device perform an internal refresh operation to refresh data stored in at least one bank of a plurality of memory banks of the DRAM memory cells.

12. The method of claim 10, wherein the refresh command specifies an auto-refresh operation.

13. The method of claim 10, further using a timer to detect a condition to trigger the command interface to generate the refresh command.

14. The method of claim 9, wherein the operation code to enable the calibration operation in parallel with the refresh operation includes a bit to specify a calibration of odd or even links of the data interface of the DRAM device.

15. The method of claim 9, wherein the operation code to enable the calibration operation includes a bit to specify a transmit or receive calibration of the data interface of the DRAM device.

16. The method of claim 9, wherein the operation code to enable the calibration operation includes one or more bits to specify an equalization calibration of the data interface of the DRAM device.

17. A memory controller to control a dynamic random access memory (DRAM) device that includes a data interface to receive data, and DRAM memory cells, the memory controller comprising:

command transmission means to transmit an operation code to the DRAM device to enable a calibration operation of the data interface of the DRAM device to occur in parallel with a refresh operation of the DRAM memory cells; and data receiving means to receive a data pattern, in connection with the calibration operation, from the data interface of the DRAM device.

18. The memory controller of claim 17, wherein the command transmission means is to transmit a refresh command that initiates the refresh operation, and the operation code is transmitted as part of the refresh command.

19. The memory controller of claim 18, further comprising refresh timer means to detect a condition to trigger the command transmission means to generate the refresh command.

20. The memory controller of claim 17, wherein the operation code to enable the calibration operation in parallel with the refresh operation includes a bit to specify a calibration of odd or even links of the data interface of the DRAM device.

* * * * *